(12) United States Patent
Srinivasan

(10) Patent No.: US 11,736,457 B2
(45) Date of Patent: *Aug. 22, 2023

(54) SYSTEMS AND METHODS FOR MANAGING DATA BASED ON SECRET SHARING

(71) Applicant: SplitByte Inc., Los Gatos, CA (US)

(72) Inventor: Arvind Srinivasan, Los Gatos, CA (US)

(73) Assignee: SplitByte Inc., Los Gatos, CA (US)

( * ) Notice: Subject to any disclaimer, the term of this patent is extended or adjusted under 35 U.S.C. 154(b) by 345 days.

This patent is subject to a terminal disclaimer.

(21) Appl. No.: 17/234,649

(22) Filed: Apr. 19, 2021

(65) Prior Publication Data

US 2022/0103533 A1 Mar. 31, 2022

Related U.S. Application Data

(63) Continuation-in-part of application No. 16/190,079, filed on Nov. 13, 2018, now Pat. No. 10,985,911.

(51) Int. Cl.
*G06F 21/00* (2013.01)
*H04L 9/40* (2022.01)
(Continued)

(52) U.S. Cl.
CPC .......... *H04L 63/0435* (2013.01); *H04L 63/02* (2013.01); *H04L 63/062* (2013.01);
(Continued)

(58) Field of Classification Search
CPC ... H04L 9/085; H04L 9/0668; H04L 63/0442; H04L 63/045; H04L 9/0662; G06F 21/602
(Continued)

(56) References Cited

U.S. PATENT DOCUMENTS 6,345,101 B1 * 2/2002 Shukla .................. H04L 9/0662
380/255
7,995,765 B2 * 8/2011 Schneider ............... H04L 9/085
380/278

(Continued)

OTHER PUBLICATIONS

Krawczyk, Hugo, "Secret Sharing Made Short", retrieved from the Internet <URL: http://www.cs.cornell.edu/courses/cs754/2001fa/secretshort.pdf>, retrieved on Nov. 24, 2008, Jan. 1, 1998 (Jan. 1, 1998), XP002505270, pp. 1-11.

(Continued)

*Primary Examiner* — Longbit Chai
(74) *Attorney, Agent, or Firm* — Sheppard Mullin Richter & Hampton

(57) ABSTRACT

Systems and methods are provided for obtaining data to be secured based on a secret sharing technique, the data being associated with a file identifier and a split specification that includes at least a number of splits n and a minimum number of splits m required for reconstructing the data, and a Repeatable Random Sequence Generator (RRSG) RRSG scheme. An RRSG state can be initialized based at least in part on a given data transformation key to provide repeatable sequence of random bytes. For every m bytes of data: a polynomial whose coefficients are determined based at least in part on m bytes of the data and a portion of the repeatable sequence of random bytes can be determined; the polynomial can be evaluated at n unique values determined by a portion of repeatable sequence of random bytes to generate n bytes. Each byte can be stored into one of the n split stores.

20 Claims, 14 Drawing Sheets

(51) Int. Cl.
    *H04L 65/61*     (2022.01)
    *H04L 65/65*     (2022.01)

(52) U.S. Cl.
    CPC ............ *H04L 63/065* (2013.01); *H04L 65/61* (2022.05); *H04L 65/65* (2022.05)

(58) Field of Classification Search
    USPC .......................................................... 726/24
    See application file for complete search history.

(56) References Cited

U.S. PATENT DOCUMENTS

| | | | |
|---|---|---|---|
| 9,813,243 B1* | 11/2017 | Triandopoulos | H04L 63/061 |
| 10,084,596 B1* | 9/2018 | Triandopoulos | H04L 9/085 |
| 2003/0147535 A1 | 8/2003 | Nadooshan et al. | |
| 2007/0160197 A1 | 7/2007 | Kagaya et al. | |
| 2009/0132830 A1* | 5/2009 | Haga | H04L 9/085 |
| | | | 713/189 |
| 2014/0270165 A1 | 9/2014 | Durand | |
| 2016/0379005 A1 | 12/2016 | O'Hare et al. | |

OTHER PUBLICATIONS

Chen, Qi, "Secret Sharing", Dec. 14, 2015, retrieved from <https://faculty.coe.drexel.edu/jwalsh/Qi_Secretsharing.pdf> (46 pages).

Loruenser, T., "Advanced Architecture for Distributed Storage in Dynamic Environments (SECOSTOR Tool), Deliverable D5.3", Jul. 29, 2017, retrieved from <http://prismacloud.eu/wp-content/uploads/2017/10/D5.3.pdf>, 71 pages.

International Patent Application No. PCT/US2019/060096, International Search Report and Written Opinion dated Jan. 14, 2020, 10 pages.

* cited by examiner

RRSG (method A)

General Split Process for Hardened Shamir Secret Sharing (i) Splitting of Generated Random Key [uses two sources of random generation]

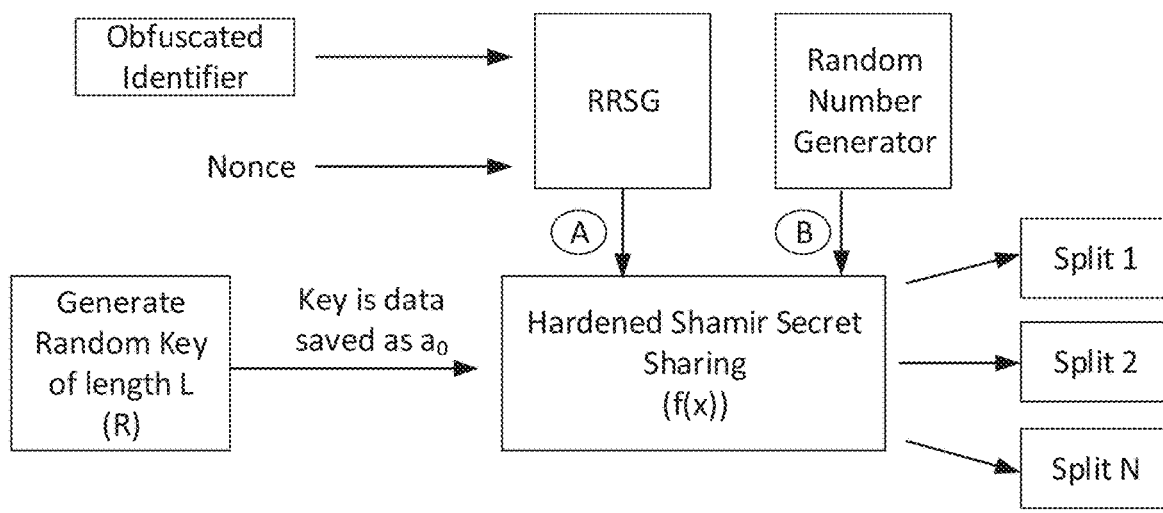

Ⓐ  RRSG can be used to generate the following:
   - $x$ values for each split
   - Store order shuffled using Fisher-Yates algorithm
   - Prime polynomial for the calculations Ⓑ  A pure (or traditional) random number generator can be used for values of $a_1, a_2, a_3, \ldots, a_{m-1}$.

FIGURE 3E

Recovery Process

(i) Reconstruction of Random Key

- Select any *m* out of *n* splits

- Find obfuscated identifier

- Select RRSG method (a) or (b) from split specification
- Recover random key *R* of *L* bytes (A) RRSG can be used to again generate the following:
 - *x* values for each split
 - Store order shuffled using Fisher-Yates algorithm
 - Prime polynomial for each data block Recovery Process (ii) Reconstruction of Data

- Use same $m$ selected splits from (i) Reconstruction of Random Key

- Select RRSG method (a) or (b) from split specification

- Recover the data $m$ bytes at a time

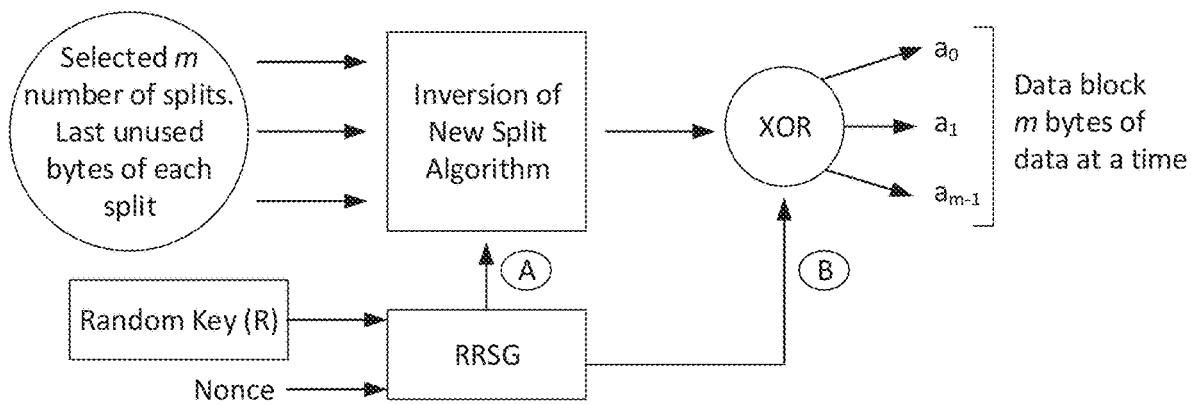

(A) RRSG can be used to generate the following:
- $x$ values used during split process
- Store order which was shuffled using Fisher-Yates algorithm
- Prime polynomials used for previous calculations (B) RRSG also used to generate numbers to XOR to determine data based coefficients

FIGURE 3H

RRSG (method C) – Example with ChaCha stream cipher

1st block (0–63) bytes

2nd block (64–127) bytes nth block ((n-1)+64) – (64n-1) bytes

Note: This is randomly seekable using the right counter.

SYSTEMS AND METHODS FOR MANAGING DATA BASED ON SECRET SHARING

CROSS-REFERENCE TO RELATED APPLICATIONS

This application claims priority to and is a continuation-in-part of U.S. patent application Ser. No. 16/190,079, filed on Nov. 13, 2018 and entitled "SYSTEMS AND METHODS FOR MANAGING DATA BASED ON SECRET SHARING," which is incorporated herein by reference in its entirety.

FIELD OF THE INVENTION

The present technology relates to managing data. More particularly, the present technology relates to splitting and storing data for purposes of secrecy.

BACKGROUND

In general, data is often secured by various methods. Some of these methods are focused on preventing access to the data using, for example, virtual private networks (VPN), web application firewalls (WAF), or network firewalls. Other methods seek to protect data by manipulating the data using, for example, an encoding or encryption process. Another class of methods attempt to protect data by splitting the data into several pieces that can later be reconstructed.

SUMMARY

Various embodiments of the present disclosure can include systems, methods, and non-transitory computer readable media configured to obtain data to be secured based on a secret sharing technique, the data being associated with a file identifier and a split specification that includes at least a number of splits n and a minimum number of splits m required for reconstructing the data with m≤n and n≥2, and a Repeatable Random Sequence Generator (RRSG) RRSG scheme. An RRSG state can be initialized based at least in part on a given data transformation key to provide repeatable sequence of random bytes. For every m bytes of data: a polynomial whose coefficients are determined based at least in part on m bytes of the data and a portion of the repeatable sequence of random bytes can be determined; the polynomial can be evaluated at n unique values determined by a portion of repeatable sequence of random bytes to generate n bytes. Each byte can be stored into one of the n split stores.

Various embodiments of the present disclosure can include systems, methods, and non-transitory computer readable media configured to determine a file identifier and a split specification for data to be reconstructed based on a secret sharing technique and a data transformation key used to initialize an RRSG state. The RRSG state can be initialized based at least in part on the data transformation key. Chosen m splits required for reconstructing the data can be obtained. For every byte of the m splits: polynomial coefficients can be determined using the m splits and a portion of repeatable sequence of random bytes and the m original data bytes can be reconstructed using the polynomial coefficients and a portion of repeatable sequence of random bytes.

Many other features and embodiments of the invention will be apparent from the accompanying drawings and from the following detailed description.

BRIEF DESCRIPTION OF THE DRAWINGS

FIGS. 3A-3J illustrate approaches for splitting and reconstructing data, according to embodiments of the present disclosure.

Figure 1:
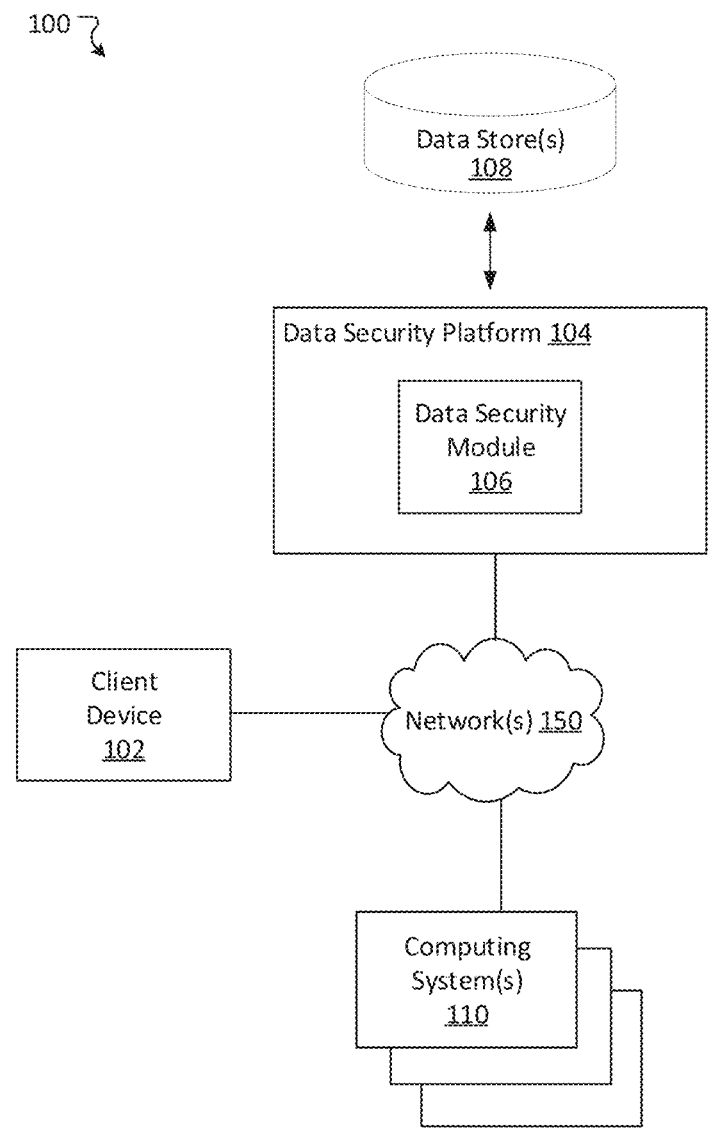
FIG. 1 illustrates an example system, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Managing Data Based on Secret Sharing

As mentioned, data is often secured by various methods. Some of these methods are focused on preventing access to the data using, for example, virtual private networks (VPN), web application firewalls (WAF), or network firewalls. Other methods seek to protect data by manipulating the data using, for example, an encoding or encryption process. Another class of methods attempt to protect data by splitting the data into several pieces that can later be reconstructed.

Several methods have been discovered to split data for various purposes. A class of algorithms knows as Secret Sharing can be utilized to split data so that a minimum of m shares out of n splits are needed to reconstruct the data. As a result, having access to less than m splits (e.g., m−1) will not yield any information about the data. Secret Sharing algorithms can be computed using finite fields to minimize information leaks and increase computational efficiency. One of the most common finite fields used is the Galois Field (GF) and in particular finite fields defined by $GF(2^8)$, $GF(2^{16})$, and $GF(2^{32})$. In general, for a given message, at least m splits out of a total n splits of the message are required to reconstruct the message. Therefore, a polynomial of choice must be of (m−1) order. For example, if four splits are required to reconstruct a message, then a 3rd order polynomial is needed. Accordingly, such a polynomial can be defined as:

$$f(x)=\Sigma_{i=0}^{m-1} a_i x^i.$$

While the approaches described herein are discussed in relation to a finite field defined by $GF(2^8)$, the approaches can be adapted for use with other finite fields. For simplicity, the approaches described herein are configured to process data being split on a per-byte basis (i.e., one byte at a time). Of course, other implementations for splitting data using different portion sizes (e.g., multiple bytes at a time) are contemplated.

Figure 3A:
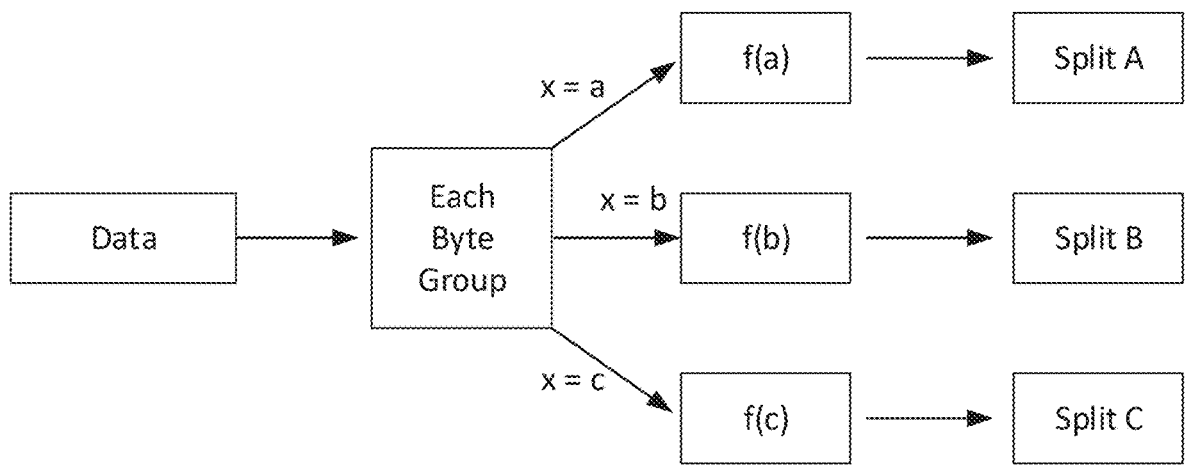

A conventional Shamir secret sharing method can be utilized to split data (e.g., a message) as illustrated in the example of FIG. 3A. For example, a unique x value can be selected for each split. For example, an x value for a first split can be 1 (or a), an x value for a second split can be 2 (or b), an x value for a third split can be 3 (or c). In this example, a prime polynomial typically needs to be selected before a Galois field can be defined. For example, for GF($2^8$), the value 0x11b can be selected as the prime polynomial. Next, for each ith byte of the message, the polynomial coefficient $a_0$ is chosen as the data byte. The other polynomial coefficients are selected randomly using a generally known secure random number generator. Further, for each ith byte of the message, f(x) is evaluated for each split by using a corresponding x value that was selected for the split. The evaluated result is stored as the ith byte of the split. In order to recover this data, we may use any "m" splits of data. The split also carries the associated "x" value for the split. We now need to solve for the constant polynomial coefficient $a_0$ and this corresponds to the data byte. An efficient Lagrange Polynomial method can be used to recover data from any splits generated by this conventional Shamir secret sharing method. However, the Shamir secret sharing method has drawbacks. For example, the Shamir secret sharing method is not space efficient. That is, if the original data size is 's' bytes, the space required to store all 'n' splits would be n*s (or n multiplied by s). There are Information Dispersal Algorithms (IDA) such as Reed Solomon Erasure codes that can partition information into n parts, such that m parts out of n are needed to reconstruct information and these algorithms can utilize a space in the order of $$\frac{n*s}{m}.$$

However, these partitions are typically not cryptographically secure as knowing some shares would potentially yield information about the data being secured.

A claimed solution rooted in computer technology overcomes problems in conventional approaches. In various embodiments, a process for generating splits of data (e.g., a message) is contemplated. In some embodiments, the process can generate splits for a message having a size defined by $$\frac{n*s}{m} + n*(\text{random key size}).$$

Accordingly, the resulting overhead is fixed regardless of the message size. Further, in some embodiments, the generated splits are cryptographically secure. Moreover, in some embodiments, a number of hardening methods can be added to the process so that the message can be recovered only by knowing a minimum number of splits m and also knowing one or more keys in a defined split specification and/or a file identifier corresponding to the message (or data) being split. In some embodiments, hardening through obfuscation can further provide additional security if a certain number of shares are compromised. In addition, hardening at various steps of algorithm using random bytes of RRSG, including specific share store order based random shuffling, using 30 different GF(256) fields randomly selected via RRSG for every set of m bytes of data, mixing random bytes with data to increase the entropy of the data to be secured, generating different x's for every m bytes of data via RRSG. All these are very unique to the claimed solution. In addition, transformations defined in split specifications creates machined generated split specific file identifiers. These makes recovering information from the shares very difficult even if all the shares are compromised. In addition an enhance algorithm called as successive Lagrange polynomial interpolation algorithm is used to recover the polynomial coefficients under GF(256). Thus, the claimed solution has many advantages and the process is flexible enough to have many variations.

FIG. 1 illustrates an example system 100 including a client device 102, a data security platform 104, and one or more computing systems 110. The client device 102 may be any computing device having one or more processors, e.g., a mobile device. The data security platform 104 can include one or more computing systems that each have one or more processors and memory. The data security platform 104 can include a data security module 106 that can be used to secure data (e.g., messages), as discussed in more detail herein. The one or more computing systems 110 can each have one or more processors and memory. The client device 102, the data security platform module 104, and the one or more computing systems 110 can communicate with one another over one or more networks 150 such as computer networks (e.g., the Internet, local area networks, etc.) or other transmission mediums. The components of the data security platform 104 may communicate with a data store 108. The data store 108 can be configured to store and maintain various types of data to facilitate secret sharing, as discussed in more detail herein. It is noted the components shown in this figure and all figures herein are examples only, and other implementations may include additional, fewer, integrated, or different components. Some components may not be shown so as not to obscure relevant details.

In various embodiments, the client device 102 can interact with the data security platform 104 over the network(s) 150 to split and store data (e.g., messages). For example, a user operating the client device 102 may interact with the data security platform 104 using a software application running on the client device 102 (e.g., a web browser, an app). In some instances, the user may identify data (e.g., a message, file, document, directory, or some sequence of bytes) to be split and stored by the data security platform 104. In such instances, the data security module 106 implemented by the data security platform 104 can receive and process the data to be split and stored. For example, the data security module 106 can split the data into a predefined number of splits (e.g., n splits) where some of those splits are needed (e.g., m splits) to recover (or reconstruct) the data. In some embodiments, the data security platform 104 can store splits corresponding to the data in the data store 108. In some embodiments, the data security platform 104 can store splits corresponding to the data at the one or more computing systems 110. For example, each computing system 110 may be associated with a corresponding split store. In some embodiments, a split store may be a data store in which splits corresponding to data can be stored. In some embodiments, each of the computing systems 110 can be associated with a corresponding geographic region (e.g., a state, country, continent, etc.). In such embodiments, the data security platform 104 can be instructed to store splits corresponding to the data in computing systems 110 that are located in one or more geographic regions. In some embodiments, the user operating the client device 102 can interact with the data security platform 104 to request reconstruction of the splits corresponding to the data. In response, the data security module 106 can obtain and reconstruct the splits corresponding to the data. The data security module 106 can then provide the reconstructed data to the client device 102 over the network(s) 150. In some embodiments, the data security module 106 can store the reconstructed data at some specified destination, e.g., the data store 108. More details regarding the data security module 106 are provided below in reference to FIG. 2.

Figure 2:
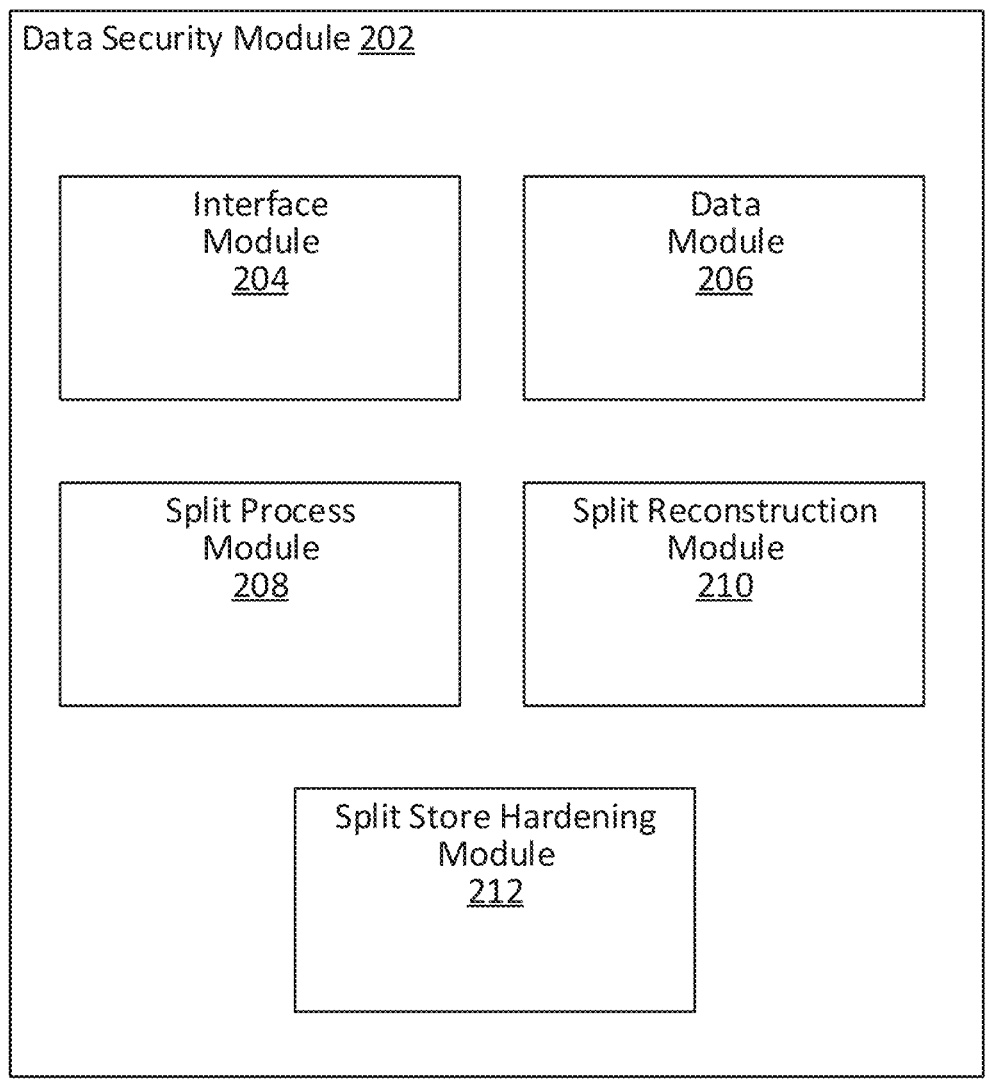
FIG. 2 illustrates an example data security module, according to an embodiment of the present disclosure.

FIG. 2 illustrates an example data security module 202, according to an embodiment of the present disclosure. The data security module 202 includes an interface module 204, a data module 206, a split process module 208, a split reconstruction module 210, and a split store hardening module 212.

The interface module 204 can be configured to provide an interface through which requests for splitting and reconstructing data can be processed. For example, depending on the implementation, the interface module 204 may provide a graphical user interface, an application programming interface, or a combination thereof.

The data module 206 can be configured to receive or obtain data to be secured by the split process module 208. For purposes of simplifying the discussion, the disclosed approaches for securing information will be described in reference to data in the form of a file. However, these approaches can easily be applied to any form of data including a message, a document, a content item, a directory of files, a network- or cloud-based data store, some sequence of bytes, or a separate stream of data in a same file, to name some examples.

Figure 3B:
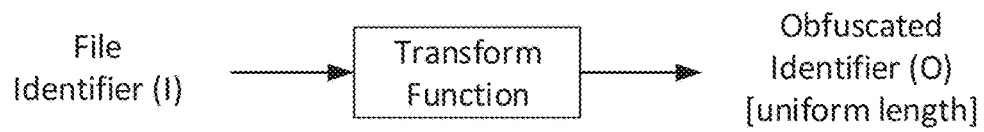
Figure 3C:
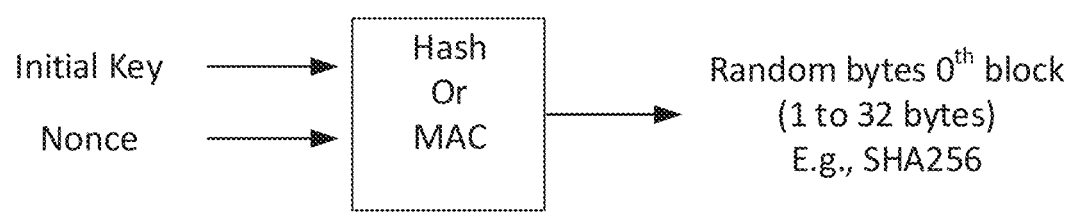
Figure 3C:
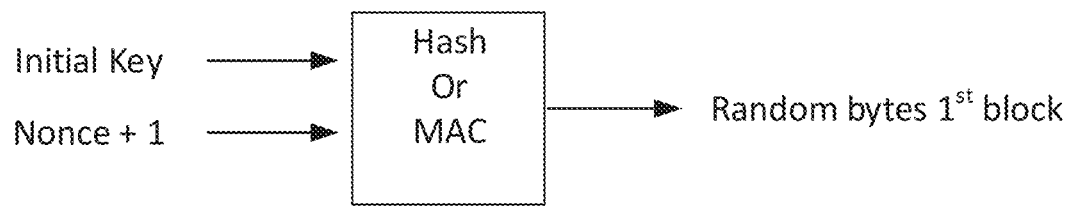
Figure 3C:
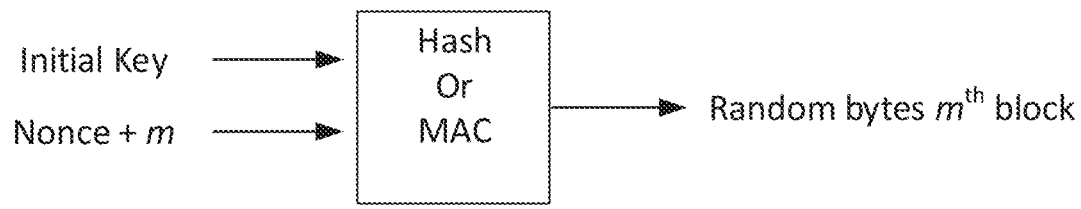
Figure 3D:
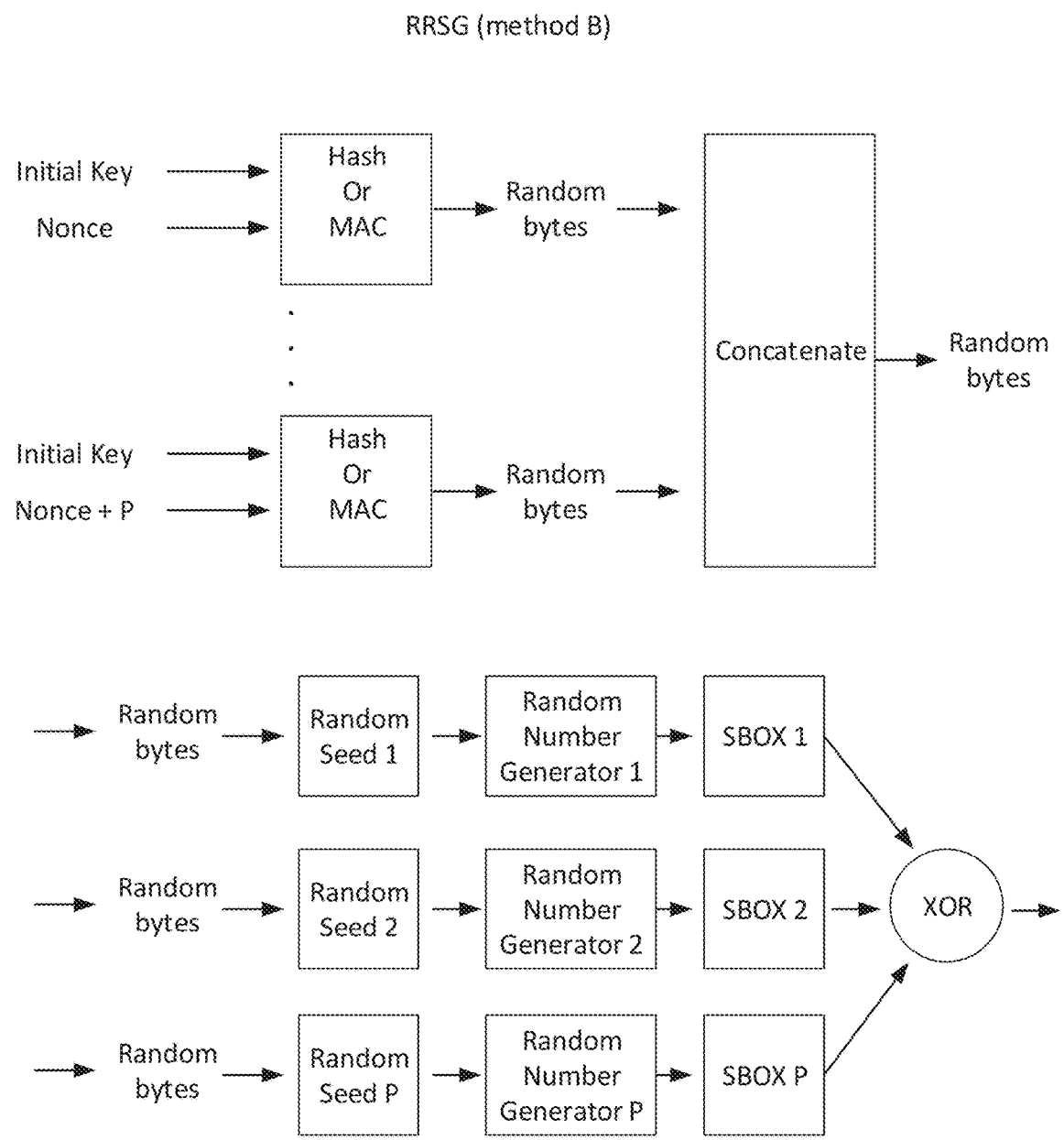

The split process module 208 can be configured to secure a file. In various embodiments, the split process module 208 secures data by splitting the file into a set of splits that each split by itself does not have any information of the data in the file. The split process module 208 can also store the set of splits corresponding to the file for future restoration (or reconstruction). In some embodiments, the split process module 208 generates a set of splits for a file based on a split specification. The split specification can serve as a virtual volume specification and may contain various information. For example, in some embodiments, the split specification can include information describing a total number of splits to be generated for a file (n) and a minimum number of splits (m) required to reconstruct the file. In some embodiments, the split specification designates a minimum number of splits (m) to be greater than 1 and a total number of splits to be generated (n) to be greater than or equal to the minimum number of splits (m). In various embodiments, each split can be stored as described in reference to FIG. 1. For example, each split can be stored locally in a data store, a network-based data store, or in a cloud-based data store. In some embodiments, the split specification can include information describing a set of secret keys to be used with one or more transformation functions. In some embodiments, a transformation function can receive an identifier as input and can output an obfuscated identifier, as illustrated in the example of FIG. 3B. In such embodiments, the transformation function itself can have an internal key. A simple transformation can involve appending the inputted identifier with a secret and a known nonce, and then generating a hash based on the appended identifier using a standard hash function, e.g., SHA256. In some embodiments, the split specification can include information describing corresponding secret keys associated with split stores. In some embodiments, an additional key can be associated at the split store level to further transform the identifier to provide additional obfuscation. In various embodiments, a split store is a data store where a split can be stored. A split store may be able to accommodate any type of split regardless of its abstraction. For example, a split store may be able to store splits corresponding to a message, a document, a content item, a directory of files, a network- or cloud-based data store, some sequence of bytes, or a separate stream of data in a same file, to name some examples. In some embodiments, the split specification can include information describing a Repeatable Random Sequence Generator (RRSG) parameter specification. An RRSG can be a function that produces a repeatable sequence of bytes when initialized with the same initial key and nonce. There are many ways to build an RRSG function and such RRSG functions can be included in the split specification. In an embodiment, an RRSG function is constructed using an initial key and nonce, as illustrated in the example of FIG. 3C. The initial key and nonce can be hashed using a standard hash function (e.g., SHA256) to produce a fixed amount of random bytes. The RRSG function can be adjusted to produce more random bytes by incrementing the nonce by one and then repeating the hashing process. In another embodiment, an RRSG function can be constructed by defining a set of PRNGs (Pseudo Random Number Generators) to be used. The defined PRNG can have a threshold randomness that satisfies some, or all, of the tests defined by Diehard or TestU01 random number test suites and have a long period. Some examples include XORShift, XORShiftStar, Mersenne Twister, and PCG family. In this embodiment, an initial key and nonce can be hashed to generate a different seed for each random number. Thus, given an initial key and a nonce, each random number is initialized with its own seed number. Further, random bytes can be generated from each random number and a bitwise XOR can be performed on the random number, as illustrated in the example of FIG. 3D. This can strengthen the random number while increasing the period. In addition, in some embodiments, the random numbers themselves can be transformed using well known transformation such as SBOX before or after combining the random numbers. These transformation provide defense against attacks to find the internal state of the random number generators.

In various embodiments, each file being secured by the split process module 208 can have a corresponding file identifier (ID) and associated content. For example, this file identifier can be a relative file path or a random GUID associated with the file name. In some embodiments, an application (or user) can secure the file using the file name itself or by creating random GUIDs transparently. The split process module 208 can generate "n" unique split identifiers—one for each split—using the file identifier and a secret key that is defined in the split specification. As a result, each split is associated with a unique split identifier that can be computed easily in a forward direction but be very difficult to reverse for purposes of determining a corresponding file identifier. For example, in some embodiments, a split identifier can be determined based on a file identifier and one or more secret keys. However, the split identifier cannot be used to determine the file identifier or the one or more secret keys on which it is based. In some embodiments, the split process module 208 can generate a root transformation key by applying a transform function defined in the split specification using a file identifier as input. In some embodiments, the generated root transformation key is used to initialize an RRSG function defined in the split specification which sets up a random number sequence. The split process module 208 can use RRSG and a generally-known Fisher-Yates algorithm to shuffle an array with elements [0, 1, 2, . . . , n−1]. In some embodiments, the shuffled array can be used to determine where an ith split is stored.

Figure 3F:
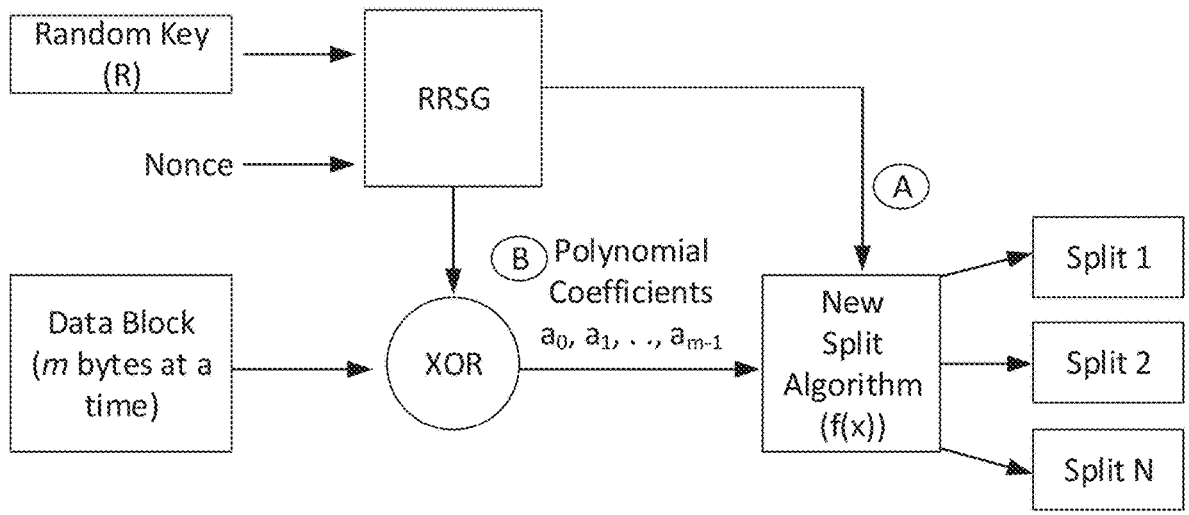
Figure 3G:
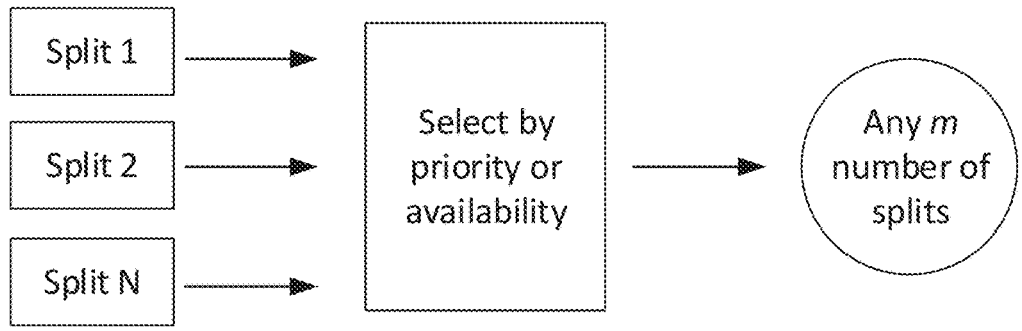
Figure 3G:
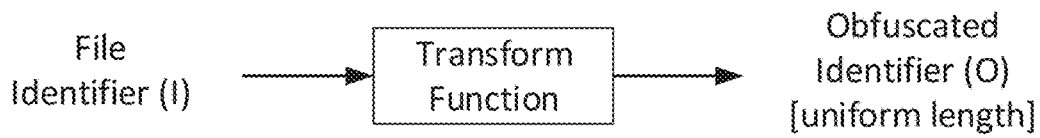
Figure 3G:
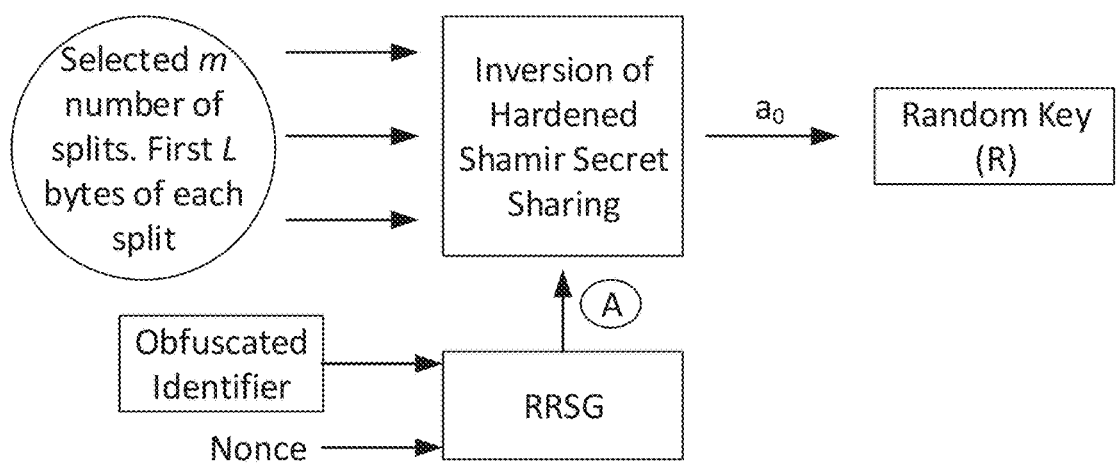
Figure 3I:
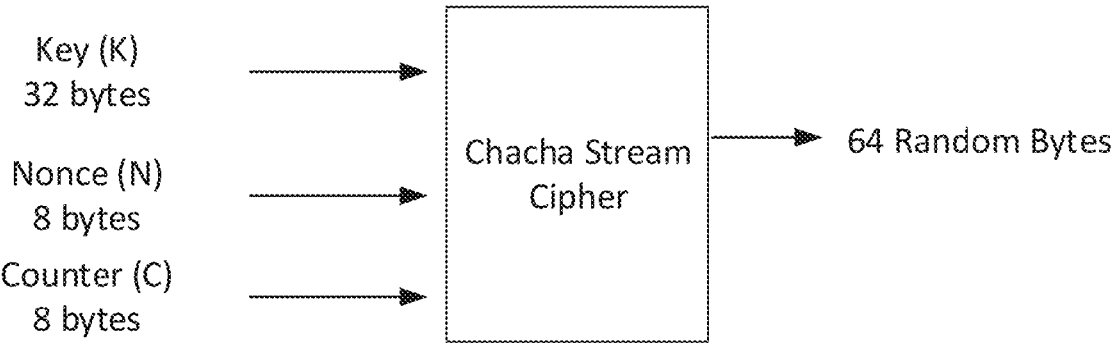
Figure 3I:
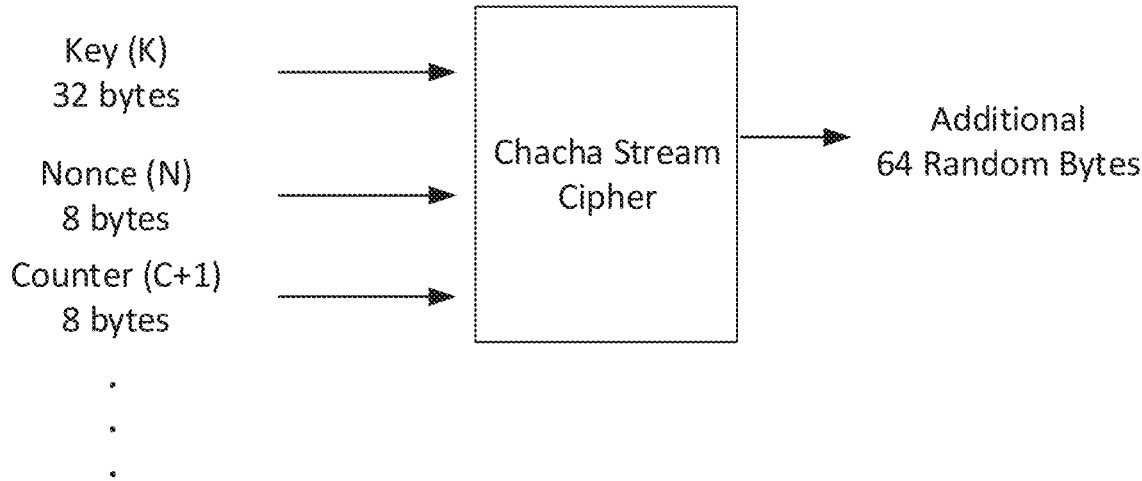
Figure 3I:
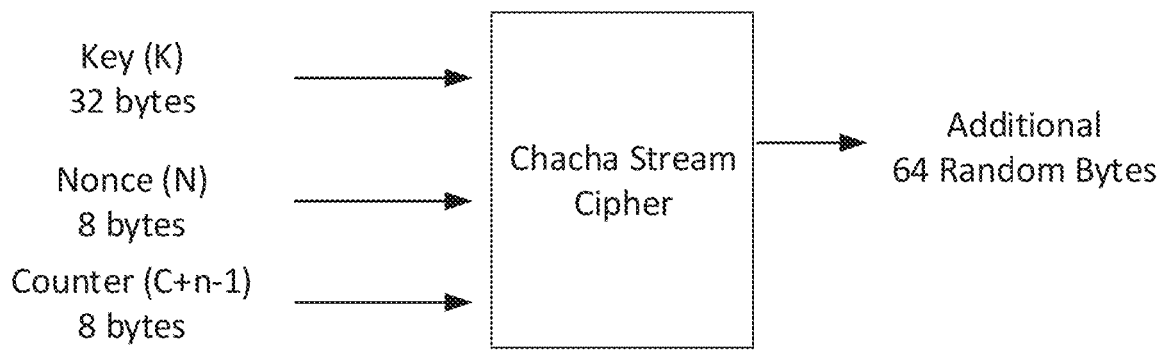
Figure 3J:
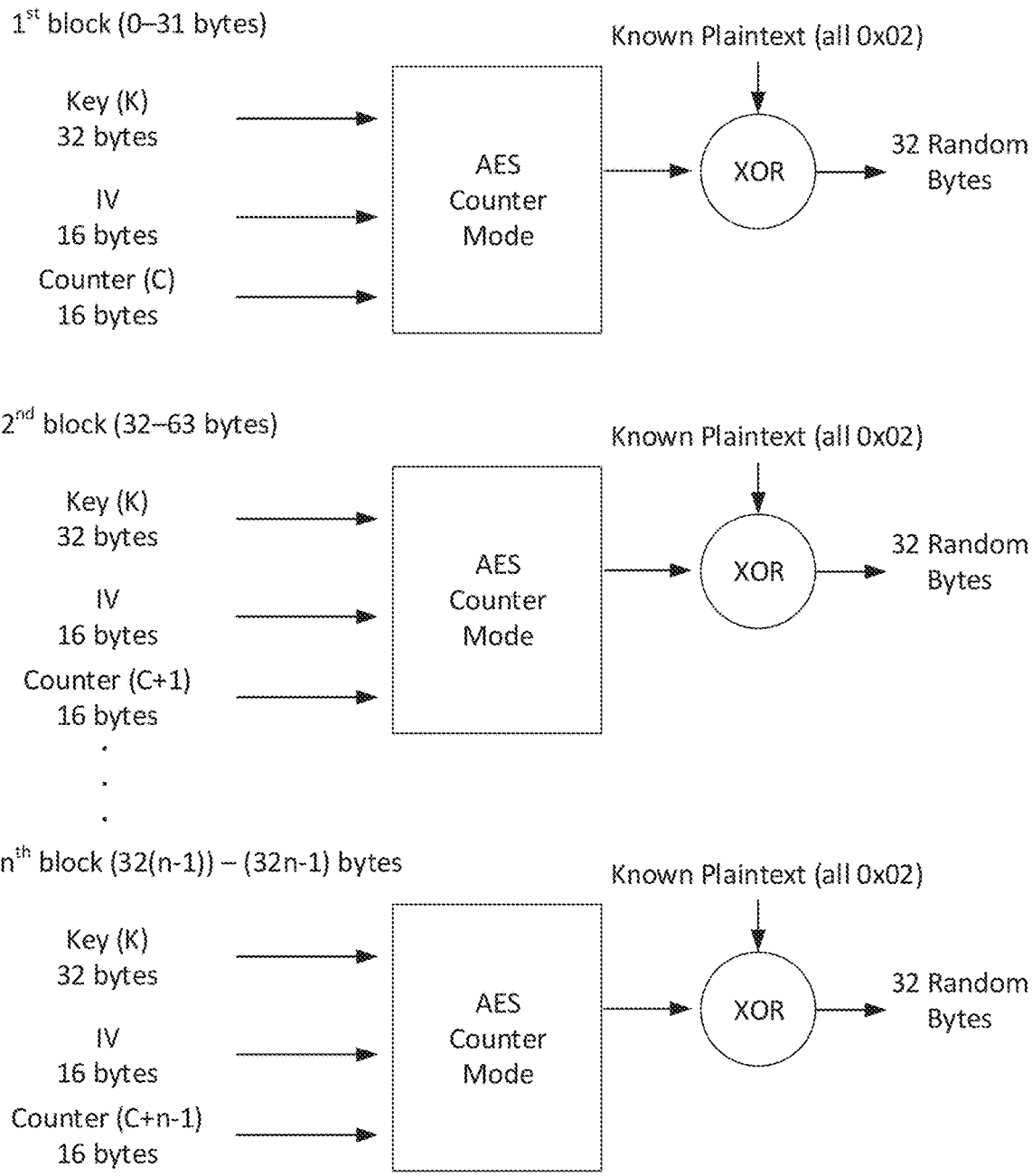

Other RRSG functions are contemplated. For example, in some embodiments, stream ciphers, such as the Salsa stream cipher (e.g., the Salsa20 family of ciphers) and the ChaCha stream cipher (e.g., the ChaCha family of ciphers), can be implemented as RRSG functions. For example, these stream ciphers can be implemented with its initial states comprising of key, counter, and nonce derived from the Data Transformation Key. As another example, any symmetric encryption algorithm (such as AES) can be implemented as an RRSG function in counter mode by encrypting a known data-sequence. A known data sequence can simply be constant data (e.g., all bytes are 0x02) or could be hex digits of well-known data source such as PI, Log(2); Natural exponent; etc.; or it could be ever repeating sequence of some defined byte array of Size S. FIG. 3I illustrates an example of RRSG based on a Stream Cipher and how the counter can be changed to repeat ably generate random numbers based at any required offsets without having to start at the beginning. As another example, any symmetric encryption algorithm (such as AES) can be implemented as an RRSG function in counter mode by encrypting a known data-sequence. A known data sequence can simply be constant data (e.g., all bytes are 0x02) or could be hex digits of well-known data source such as PI, Log(2); Natural exponent; etc.; or it could be ever repeating sequence of some defined byte array of Size S. FIG. 3J shows an example of RRSG based on Symmetric Encryption (AES-256) of a constant data (all 0x02). Here the Key and Initialization vector (IV) are kept the same while the counter is incremented as we need more random bytes. Note we can directly generate any portion of the random byte sequence by simply incrementing the counter to the required levels.

In some embodiments, a RRSG function can be randomly seek-able. For example, a randomly seek-able RRSG function can permit non-linear reads of the m split files without having to reconstruct partial content of the original file and without having to read and compute from the beginning of the file. The ability to read middle portions of large files can be especially beneficial because it facilitates reconstruction of any random subsection of data without having to regenerate RRSG bytes from the beginning of the file. For example, in some embodiments, the RRSG function can be randomly seek-able by generating any $r_i \forall i>0$, by starting the generation from $r_j$ with $(i-j)<M$ where M is a small positive integer constant (e.g., 64 bytes or less). This property facilitates reconstruction of any random subsection of data without having to regenerate RRSG bytes from the beginning of the file. In such embodiments, the computational overhead associated with the file can be modified in order of block size (e.g., a range between 512 bytes to several kilobytes). FIG. 3I and FIG. 3J show how the RRSG based on Stream Cipher (ChaCha family) and Symmetric Encryption Cipher (AES family) are random seek-able respectively.

In various embodiments, the data security module 202 can perform various operations based on a randomly seek-able RRSG function. For example, in some embodiments, based on an RRSG function that is randomly seek-able, the data security module 202 can perform parallel write operations. For instance, parallel write operations can be especially useful for large files that can span hundreds of megabytes or gigabytes. In some embodiments, the data security module 202 can apply a randomly seek-able RRSG function to split and process a single file in multiple threads. For example, the single file can be split into multiple portions each portion can be processed by a separate thread of execution in parallel with very little to no overhead.

In some embodiments, based on an RRSG function that is randomly seek-able, the data security module 202 can perform parallel read operations. For instance, when a large file is downloaded, the data security module 202 can apply an RRSG function that is randomly seek-able to allow multi-threaded processing of different portions (or regions) of the file. For example, a separate portion of the file can be downloaded in a separate thread. Once downloaded, the separate portions can be assembled to produce the file in its entirety.

In some embodiments, based on an RRSG function that is randomly seek-able, the data security module 202 can perform range read operations. For instance, a single file may be a container of several large files. For example, some file formats (e.g., tar file format, Lucene's cfs file format and other standard and proprietary container formats) can be used to create compound files that serve as a container in which many individual files are included. A compound file can be associated with metadata that provides information (e.g., offsets, file length/size, signature) describing files included in the compound file. In some embodiments, the data security module 202 can perform range read functions to access one or more files included in the compound file. For example, to access a file included in the compound file, the data security module 202 can implement a range read function that obtains a certain number of bytes associated with the file, such as the file size, beginning at an offset that corresponds to a beginning of the file. In some other embodiments, the data security module 202 can read multiple random sections within a file, or a compound file, by specifying an array of offsets and an array of lengths. Such functionality facilitates retrieval of multiple small files, or content associated with a compound file, using a single API call, thereby providing highly efficient reads with reduced latency.

In some embodiments, based on an RRSG function that is randomly seek-able, the data security module 202 can be configured to verify file streams using magic bytes. For example, a beginning of a file stream can be associated magic bytes. The file stream can end with a fixed byte sequence or a signature. The signature can be based on Cyclical Redundancy Check (CRC) methods, such as CRC32 or Adler32, or a digest, such as MD5, SHA1, SHA 256, etc. Based on these data security features, the data security module 202 can verify the integrity of data associated with the file stream as the data is streamed. That is, the data security module 202 can automatically detect data errors that are malicious, tampered, or otherwise. The data security module 202 can also detect a truncated file stream when processing valid, but incomplete data. This technique for verifying file streams based on magic bytes at the beginning followed by a signature at the end can be performed on both raw content prior to splitting and after splitting to the each of the split streams. This allows the system to automatically detect or isolate any errors to a specific split stream. For example, if a 3-out-5 threshold reconstruction scheme is being applied, knowing which stream is erroneous (e.g., malicious, tampered, etc.) allows corrective action to be taken by avoiding that specific stream. Similarly, having the integrity checks on the raw stream can increase confidence and help guarantee there are no errors in reading and assembling of the data.

Next, the split process module 208 can generate a random Data Transformation key of fixed size as specified in the split specification. This Data Transformation key can be used to produce (or reproduce) a set of splits corresponding to some data (e.g., a file). In some embodiments, the split process module 208 splits the Data Transformation key using a hardened Shamir Secret sharing methodology using Galois Field($2^8$) algebra, as illustrated in the example of FIG. 3E. A Galois polynomial to be used can be determined based on a specified minimum number of required shares (m) as defined above. In some embodiments, this polynomial can formally be stated as follows:

$$f(x)=\Sigma_{i=0}^{m-1} a_i x^i.$$

For each byte of the Data Transformation key, the split process module 208 can determine a Galois prime polynomial using an RRSG function. Since there are 30 prime polynomials in $GF(2^8)$, the split process module 208 can select a Galois prime polynomial from 0 to 29 by generating a random integer using an RRSG function and determining a modulus after dividing the random integer by 30. Naturally, this process can be modified accordingly when using a different Galois Field. Next, for each byte of the Data Transformation key, the split process module 208 then sets $a_0$ as the Data Transformation key byte to be split. The remaining coefficients $a_1$ to $a_{m-1}$ are chosen randomly. In some embodiments, the coefficients are generated randomly using an unknown seed thereby making them non-repeatable. Next, for each byte of the Data Transformation key, the split process module 208 generates n unique x values such that x is greater than or equal to (>=) to 2 and x is less than or equal to (<=) 255 using an RRSG function. In some embodiments, more than n x values may be generated so that n unique x values can be generated. Next, for each byte of the Data Transformation key, the split process module 208 can evaluate the polynomial function using the n unique x values to generate n corresponding y values (split values). In some embodiments, the generated y values are stored based on the array-based split mapping as described above. Using this approach, the split process module 208 can store the Data Transformation key of length L bytes across a total of n splits. In various embodiments, this Data Transformation key can be retrieved using any m splits of the total n splits. In some embodiments, each split will be L bytes.

The split process module 208 can generate splits for the file being secured. In some embodiments, the split process module 208 can use the Data Transformation key and a nonce value of 1 to reset the RRSG function. The split process module 208 can then generate splits for the file with every m data bytes generating n bytes with each store stored on a single split, as illustrated in the example of FIG. 3F. This is very space efficient compared to the original Shamir Secret Sharing methodology. In some embodiments, the file size needs to be a multiple of m and use an appropriate padding technique such as PKCS #7. In some embodiments, for every m bytes of data, the split process module 208 can use an RRSG function to select a Galois prime polynomial. As mentioned, there are 30 prime polynomials in $GF(2^8)$. These prime polynomials are as follows: 0x11b, 0x11d, 0x12b, 0x12d, 0x139, 0x13f, 0x14d, 0x15f, 0x163, 0x165, 0x169, 0x171, 0x177, 0x17b, 0x187, 0x18b, 0x18d, 0x19f, 0x1a3, 0x1a9, 0x1b1, 0x1bd, 0x1c3, 0x1cf, 0x1d7, 0x1dd, 0x1e7, 0x1f3, 0x1f5, 0x1f9. In some embodiments, the split process module 208 can randomly generate an index 0 to 29 using both the RRSG function and the prime polynomial corresponding to that index for doing the algebra for this byte. This can add to the encryption strength. Next, for every m bytes of data, the split process module 208 can generate n unique x values such that x is greater than or equal to (>=) 2 and less than or equal to (<=) 255 using RRSG. In some instances, the split process module 208 may generate more than n of the x values to generate n unique x values. In some embodiments, for every m bytes of data, the split process module 208 can then generate m random bytes r using RRSG. In such embodiments, the split process module 208 can set the coefficients $a_0$ to $a_{m-1}$ as $a_1 = d_i \wedge r_i$ where $d_i$ is the P data byte, $r_i$ is the $i^{th}$ random byte generated using RRSG, and $\wedge$ is the bitwise XOR operator. When the RRSG is based on a stream cipher such as Salsa or ChaCha, this step is equivalent to stream encryption of the raw data with the key (or initial stream encryption state) being derived from the Data Transformation Key. In some embodiments, for every m bytes of data, the split process module 208 can evaluate the polynomial function using the n unique x values to generate n corresponding y values (split values). The generated y values can be stored based on the array-based split mapping as described above. Thus, each split can store a number of bytes as follows:

$$\frac{\text{data\_size} + \text{padding}}{m}$$

plus another 20 or so bytes for storing the Data Transformation key. As a result, the described approaches are much more efficient than other conventional approaches such as Shamir Secret Sharing. Moreover, the described approaches are almost the original data size when all splits are needed, i.e., m and n are equal.

The split reconstruction module 210 can be configured to reconstruct split data. For example, the split reconstruction module 210 can reconstruct data that was split by the split process module 208. In some embodiments, the split reconstruction module 210 can be instructed to reconstruct stored data (e.g., a file) based on a corresponding file identifier and split information as illustrated in the example of FIG. 3G. For example, an authenticated user may instruct a computing device to provide the identifier and parameters describing the split specification for reconstructing the file. In some embodiments, a simple split specification identifier can be used to identify (or determine) the parameters associated with the split specification. In some embodiments, the user can also specify which m of the total n splits corresponding to the file need to be used for the reconstruction. In some embodiments, the m splits can be determined automatically based on availability and one or more latency thresholds. When reconstructing the file, the split reconstruction module 210 can use the file identifier to generate a split identifier by applying a transform function defined in the split specification using the file identifier as input as described above. This split identifier can then be used to initialize an RRSG function defined in the split specification as described above.

The split reconstruction module 210 can use the RRSG function and the generally-known Fisher-Yates algorithm to shuffle an array with elements [0, 1, 2, . . . , n−1]. In some embodiments, the shuffled array can be used to determine where an ith split is stored. The split reconstruction module 210 can use index information for each split store to generate a mapping array [$s_1$, $s_2$, . . . , $s_m$] where $s_1$, $s_2$, . . . , $s_m$ are integers between 0 and n−1. The split reconstruction module 210 can use this information to determine which x value to associate with each split. In some embodiments, another array for y values can be constructed as bytes from each split are read. The array for y values can be constructed as [$y_1$, $y_2$, . . . , $y_m$] where $y_i$ is a byte read from the $i^{th}$ split to be read.

Next, the split reconstruction module 210 can recover the Data Transformation key of size L as described above. In some embodiments, for each byte (1 to L) in the Data Transformation key, the split reconstruction module 210 can use RRSG to pick a Galois prime polynomial. As mentioned, since there are 30 prime polynomials in $GF(2^8)$, the split reconstruction module 210 can pick from 0 to 29 by generating a random integer using RRSG and determining modulus after dividing by 30. In various embodiments, this result should match the random prime polynomial identifier that was generated during the split process as described above. In some embodiments, for each byte (1 to L) in the Data Transformation key, the split reconstruction module 210 can generate the same n unique x values such that x is greater than or equal to (>=) 2 and less than or equal to (<=) 255 using RRSG as described above. The split reconstruction module 210 can then use the mapping array generated above to determine x values (i.e., $[x_{s_1}, x_{s_2}, \ldots, x_{s_m}]$ and construct y values $[y_1, y_2, \ldots, y_m]$ where $y_i$ is a byte read from the $i^{th}$ split to be read.

In some embodiments, for each byte (1 to L) in the Data Transformation key, the split reconstruction module 210 can recover only the polynomial coefficient $a_0$. In such embodiments, the split reconstruction module 210 can perform some or all computations using $GF(2^8)$ using the prime polynomial generated using RRSG as described above. In some embodiments, the split reconstruction module 210 uses Lagrange polynomials to determine a constant term as follows:

$$a_0 = L(0) = \sum_{j=0}^{m-1} y(x_j) \prod_{k=0, k \neq j}^{m-1} \frac{x_k}{x_k - x_j}.$$

The split reconstruction module 210 can then recover the Data Transformation key that was generated and used by the split process module 208 as described above. In some embodiments, the split reconstruction module 210 can use this Data Transformation key and nonce value 1 to reset the RRSG function. The split reconstruction module 210 can then reconstruct data (e.g., the file) from the m splits, as illustrated in the example of FIG. 3H. In some embodiments, for each byte of the m splits starting at offset L, the following computations are performed to recover the file. First, for each byte of the m splits starting at offset L, the split reconstruction module 210 can pick a Galois prime polynomial using the RRSG function. As mentioned, since there are 30 prime polynomials in $GF(2^8)$, the split reconstruction module 210 can pick from 0 to 29 by generating a random integer using RRSG and determining modulus after dividing by 30. In various embodiments, this result should match the random prime polynomial identifier that was generated during the split process as described above. Next, for each byte of the m splits starting at offset L, the split reconstruction module 210 can generate the same n unique x values such that x is greater than or equal to (>=) 2 and less than or equal to (<=) 255 using the RRSG function as described above. In some embodiments, the split reconstruction module 210 generates all the unique n random x values even though the split reconstruction module 210 will use only m of the values. This can be done for purposes of keeping an internal state of the RRSG function the same as its internal state when the file was being split by the split process module 208. The split reconstruction module 210 can then use the mapping array generated above to determine x values (i.e., $[x_{s_1}, x_{s_2}, \ldots, x_{s_m}]$ and construct y values $[y_1, y_2, \ldots, y_m]$ where $y_i$ is a byte read from the $i^{th}$ split to be read. In some embodiments, for each byte of the m splits starting at offset L, the split reconstruction module 210 can also generate m random bytes r using the RRSG function and store in an array $[r_0, r_1, \ldots, r_m]$. For each byte of the m splits starting at offset L, the split reconstruction module 210 can then recover all of the polynomial coefficients $a_0, a_1, \ldots, a_{m-1}$. In some embodiments, the split reconstruction module 210 again uses Lagrange polynomials to determine $a_0$ as follows:

$$a_0 = L(0) = \sum_{j=0}^{m-1} y_j \prod_{k=0, k \neq j}^{m-1} \frac{x_k}{x_k - x_j}.$$

The split reconstruction module 210 can then rewrite the original polynomial as follows:

$$y_i = \sum_{j=0}^{m-1} a_j x_i^j \Rightarrow \left(\frac{y_i - a_0}{x_i}\right) = \sum_{j=0}^{m-2} a_{j+1} x_i^j.$$

This equation can be rewritten as follows:

$$y_i^{(1)} = \sum_{j=0}^{m-2} a_{j+1} x_i^j \text{ with } y_i^{(1)} = \left(\frac{y_i - a_0}{x_i}\right).$$

The split reconstruction module 210 can use this transformation to determine (or recompute) $(x_i, y_i^{(1)})$ for this polynomial. The split reconstruction module 210 can then determine $a_1$ using the formula above as follows:

$$a_1 = L(0) = \sum_{j=0}^{m-2} y_j^{(1)} \prod_{k=0, k \neq j}^{m-2} \frac{x_k}{x_k - x_j}.$$

The split reconstruction module 210 can repeat this process for every other coefficient using the recursive relation $y_i^{(t)} = \sum_{j=0}^{m-t-1} a_{j+1} x_i^j$ with $$y_i^{(t)} = \left(\frac{y_i^{(t-1)} - a_{t-1}}{x_i}\right)$$

where $0 \leq t \leq m-1$ and $y_i^{(0)} = y_i$. Similarly, the split reconstruction module 210 can determine $a_r$ as follows:

$$a_r = L(O) = \sum_{j=0}^{m-t-1} y_j^{(t)} \prod_{k=0, k \neq j}^{m-t-1} \frac{x_k}{x_k - x_j}.$$

The split reconstruction module 210 can now compute the next m bytes of data as $d_i = a_i / r_i$. At this point, the split reconstruction module 210 has reconstructed m bytes of data using 1 byte from each of the m splits used in recovery. In doing so, the split reconstruction module 210 can remove any extra bytes of padding that were added to make the data size a multiple of m.

In the situation, where only some portions of a file are required either for parallel read or for range read, as a first step, the split reconstruction module 210 recovers the Data Transformation key that was generated and used by the split process module 208 as described in paragraph [0036] and

[0037], for example. For each offset, the internal state of the RRSG is reset using the random access property of RRSG. If the start offset is not a multiple of "m", we would start the recovery at (offset−offset % m) where % is the modulo operator and end the recovery at ((offset+length)+(offset+length) % m). The split process module will use the same method described in paragraph [0038] to [0043] after setting the RRSG state using the random access property to recover the partial data. Finally, the split reconstruction module 210 can remove any excess bytes at the beginning and at the end to return just the requested bytes.

The split store hardening module 212 can be configured to manage split stores. In some embodiments, a split store is needed for non-transport application of Secret Sharing. In such embodiments, data (e.g., a file) that is split into n splits will require n split stores. In some embodiments, the split stores can be isolated from each other at various levels, e.g., stored on different file servers with different access logins, store on different networks, stored on different cloud store or a combination thereof. An entity (or attacker) may be able to gain access to one or more splits and, in a worst case, access to the minimum required m shares. When this happens, the entity typically needs to match the m splits. Theoretically, if there are $N_1, N_2, N_3, N_4, \ldots N_m$ splits, then a brute force search requires an $O(\Pi_{i=1}^{m} N_m)$ operations to match the splits. Additionally, an oracle can be used to verify if an attempted combination is correct. However, in practice, the degree of difficulty can be reduced due to the following factors: (a) initially, the server has a very few data points that result in N becoming small, (b) data stored in arrival order and one can find a match by matching timestamp, (c) using a common identifier that connects these data points, (d) length of data, as each split is identical in size, and (e) header and suffix marks. In various embodiments, the split store hardening module 212 can address these issues thereby providing a hardened solution. For example, in some embodiments, the split store hardening module 212 addresses (a) by initializing the store with certain random data points for which there are no splits. Care is taken that these resemble the regular data that get stored. In some embodiments, to address (b), the split store hardening module 212 does not to store timestamp information and the data is not stored in arrival order. Additionally, the data is shuffled once a certain amount of data comes in. In some embodiments, the split store hardening module 212 addresses (c) by using different identifiers for different splits in our split and recovery process. In some embodiments, to address (d), the split store hardening module 212 keeps the data length fixed. For example, if data is too short, random bytes are padded to data to make it appear as regular size. If the data is too long, it is split into multiple rows. In some embodiments, (e) is addressed by taking care that we do not add any headers and suffix that would reduce the matching search space.

A more detailed example of splitting a file is provided below. This example shows the process of splitting a file with m=3 and n=5, i.e., we split the file into 5 parts and at least 3 are required to reconstruct the file. The file identifier (or handle) "letters.txt" is used to store and retrieve the file. Note, we could have used an associated GUID to file name instead. The hex dump of the file is provided below:

00000000: 41 42 43 44 45 46 47 48 49 4A 4B 4C 4D 4E 4F 50|ABCDEFGHIJKLMNOP
00000010: 51 52 53 54 55 56 57 58 59 5A 0D 0A - - - - - - - -|QRSTUVWXYZ.

The original data has 28 bytes. Since n=5, this file will be split and written as 5 different streams or files. We have five different abstract stores. The store specific id of share is calculated by appending file-id UTF-8 bytes and the Store Level Key bytes and taking its SHA256 digest.

| Logical Name | Logical Id | Store Level Key | Store specific Id MapBytes(sha256(fileId + key)) |
|---|---|---|---|
| asia | 0 | ov8uvevwtszryz3vebbz9 6k5pd8296tka1pd8gw15 qxxsi4bv00000e0 | ppedhqkc305ufj91esc9ddalj6lf3id9 sv3edzag45y9y8sy400000f0 |
| africa | 1 | dxzpxnhg0x7ovzactii0gk 3jhua8l83m9259bl9wauc k5rbgh0000030 | hk50gthh9socywkjari6pzjtvxv5ruwl g9qqg3n4jvnazjok600000b0 |
| america | 2 | l954kqt4qti1d8m3smx45 1nffabkll3by7c1m9rjhvpk cyhpl0000050 | a665as4rrvg39tc5gj27nze0ggfclbxi kk2it8ggnpi2ejkgm00000b0 |
| europe | 3 | l2hmiusg0d6wk5xy4hgfg 3gxyendrwdkoy6wwj1g6 epjd31yf0000030 | lup13icp5tp37j3ldhpjnsfuszge4f3xn ppeoo3pvjpnt5ip30000010 |
| australia | 4 | mc9cxrqcvam7zrj179jqa 7dyipm37vqdg6rompb4f bq3vokvq00000f0 | n0mztnu180m7am0eet98m8z0p80 5grznoxyede5yinpw598ax0000000 |

The specification here uses implementation specific byte mapping techniques, although algorithms such as Base32 or Base64 may also be used.

RRSG

As part of a split specification, a key is defined to enable transformation. This key is called Root Transformation Key and for this example, the bytes of the key are given below:

[85 5a c3 32 ec ea 16 fc 45 8e 2b 10 4d 88 5c 23 69 6 b9 22 20 5 90 90 38 d8 9f 73 49 f1 2e c8]

The split specification also specifies the Repeatable Random Sequence Generator (RRSG). In this example, we use two RRSGs: the XORShift64Star as the first random number generator and the regular XORShift64 as the second random number generator. We also use the standard AES Sbox table shown below to map bytes.

|    | 00 | 01 | 02 | 03 | 04 | 05 | 06 | 07 | 08 | 09 | 0a | 0b | 0c | 0d | 0e | 0f |
|----|----|----|----|----|----|----|----|----|----|----|----|----|----|----|----|----|
| 00 | 63 | 7c | 77 | 7b | f2 | 6b | 6f | c5 | 30 | 01 | 67 | 2b | fe | d7 | Ab | 76 |
| 10 | ca | 82 | c9 | 7d | fa | 59 | 47 | f0 | ad | d4 | a2 | af | 9c | a4 | 72 | c0 |
| 20 | b7 | fd | 93 | 26 | 36 | 3f | f7 | cc | 34 | a5 | e5 | f1 | 71 | d8 | 31 | 15 |
| 30 | 04 | c7 | 23 | c3 | 18 | 96 | 05 | 9a | 07 | 12 | 80 | e2 | eb | 27 | b2 | 75 |
| 40 | 09 | 83 | 2c | 1a | 1b | 6e | 5a | a0 | 52 | 3b | d6 | b3 | 29 | e3 | 2f | 84 |
| 50 | 53 | d1 | 00 | ed | 20 | fc | b1 | 5b | 6a | cb | be | 39 | 4a | 4c | 58 | cf |
| 60 | d0 | ef | aa | fb | 43 | 4d | 33 | 85 | 45 | f9 | 02 | 7f | 50 | 3c | 9f | a8 |
| 70 | 51 | a3 | 40 | 8f | 92 | 9d | 38 | f5 | bc | b6 | da | 21 | 10 | ff | f3 | d2 |
| 80 | cd | 0c | 13 | ec | 5f | 97 | 44 | 17 | c4 | a7 | 7e | 3d | 64 | 5d | 19 | 73 |
| 90 | 60 | 81 | 4f | dc | 22 | 2a | 90 | 88 | 46 | ee | b8 | 14 | de | 5e | 0b | db |
| a0 | e0 | 32 | 3a | 0a | 49 | 06 | 24 | 5c | c2 | d3 | ac | 62 | 91 | 95 | e4 | 79 |
| b0 | e7 | c8 | 37 | 6d | 8d | d5 | 4e | a9 | 6c | 56 | f4 | ea | 65 | 7a | Ae | 08 |
| c0 | ba | 78 | 25 | 2e | 1c | a6 | b4 | c6 | e8 | dd | 74 | 1f | 4b | bd | 3b | 8a |
| d0 | 70 | 3e | b5 | 66 | 48 | 03 | f6 | 0e | 61 | 35 | 57 | b9 | 86 | c1 | 1d | 9e |
| e0 | e1 | f8 | 98 | 11 | 69 | d9 | 8e | 94 | 9b | 1e | 87 | e9 | ce | 55 | 28 | df |
| f0 | 8c | a1 | 89 | 0d | bf | e6 | 42 | 68 | 41 | 99 | 2d | 0f | b0 | 54 | Bb | 16 |

RRSG is now defined by giving a specific seed for each random number.

We use the file-Id "letters.txt" and the Root Transformation key to generate a key. These transformation are specific to a split specification and in this example, we simply append the bytes corresponding to utf-8 representation of file-Id and the bytes of the Root Transformation Key and compute a sha-256 digest. This result in a file-id specific key as given below:
[e4 c9 b9 e7 80 24 5f a9 69 9 9a 41 57 36 c0 37 bf e9 ac d8 85 6e e0 8f 45 ce 32 53 b0 dc 6e 53]

Now the key above is used to initialize the RRSG. We take a starting nonce of 1729 and append it to previous key and compute sha256 digest. This will give us 32 bytes of repeatable random sequence. Note if we need any more, the nonce will be incremented and a new digest will be computed to produce another 32 bytes. With the above sequence we obtained the following bytes:
[E9 C0 3F 44 4F 4C 47 AB 9E 16 38 64 50 DF 88 25 E9 A7 C9 2F 0B D1 E1 50 25 2C AA A0 73 9D 3C AE]

Now we take the first eight bytes of this information and make it seed for the first random number generator and use the second eight bytes to make the seed for the second random number generator. Thus the seeds are:
Random generator 1 seed=0xe9c03f444f4c47ab
Random generator 2 seed=0x9e16386450df8825

With the seed and the random algorithm, we have initialized the RRSG and it can now stream a repeatable set of bytes. First we generate a set of 8 bytes from each random number and then XOR the longs and use SBOX table to generate the first 8 bytes of RRSG. This process is repeated to get a continuous supply of RRSG bytes as shown in the table below:

| Loop | Random 1 Long    | Random 2 Long    | XOR (Long)       | SBOX(XOR)        |
|------|------------------|------------------|------------------|------------------|
| 0    | 15413e42e63ad997 | bb5e1ac124ecc927 | ae1f2483c2d610b0 | e4c036ec25f6cae7 |
| 1    | bcf2aed713531421 | d4d2f2d9da5a050c | 68205c0ec909112d | 45b74aabdd0182d8 |
| 2    | eeb20879b599ad44 | 7172200fc85411cf | 9fc028767dcdbc8b | dbba3438ffbd653d |

Store Order

Since n=5, we take an array [0,1,2,3,4] and use Fisher-Yates to shuffle the array. All that Fisher Yates requires is a random number generator. We used the already initialized RRSG to supply the random bytes it needs. After the shuffling the store order is [3 2 1 4 0]. This shuffling needs 4 short ints (8 bytes) of RRSG.

| Logical Name | Logical Id | Share Id | Store specific Id MapBytes(sha256(fileId + key)) |
|---|---|---|---|
| asia | 0 | 4 | ppedhqkc305ufj91esc9ddalj6lf3id9sv3edzag45y9y8sy400000f0 |
| africa | 1 | 2 | hk50gthh9socywkjari6pzjtvxv5ruwlg9qqg3n4jvnazjok600000b0 |
| america | 2 | 1 | a665as4rrvg39tc5gj27nze0ggfclbxikk2it8ggnpi2ejkgm00000b0 |
| europe | 3 | 0 | lup13icp5tp37j3ldhpjnsfuszge4f3xnppeoo3pvjpnt5ip30000010 |
| australia | 4 | 3 | n0mztnu180m7am0eet98m8z0p805grznoxyede5yinpw598ax0000000 |

Data Transformation Key

We first generate a 20 random bytes and designate it as Data Transformation key. Note this is generated by a secure random generator in a very traditional manner. The generated Data Transformation key is given below:
[35 51 73 df 79 ab 22 14 80 43 24 dc 13 54 ab 6 3e e7f1 51]

This Data Transformation key will be used to set up a new RRSG in a later step and the new RRSG will be used to split and store data. The first step is to split this Random Key using a modified hardened Shamir Secret Sharing method. Note this will generate 20 bytes for each share.

Hardened Shamir Secret Sharing

Since m=3, we use a 2nd order polynomial in GF(256) as defined by:

$$f(x)=a_0+a_1x+a_2x^2.$$

We need coefficient $[a_0\ a_1\ a_2]$ to be defined. As in typical Shamir algorithm the data byte is set as a constant coefficient. The other two coefficients are randomly generated using a secure random generator. We use the RRSG to generate a prime polynomial id (0-29) and 5 unique x values between 2 and 255. We do not use 0 or 1. Since the numbers are small, we use 2 bytes of RRSG and use the modulus by dividing by maximum values.

[35 51 73 df 79 ab 22 14 80 43 24 dc 13 54 ab 6 3e e7f1 51]

| Index | Data (Hex) | Polynomial | Prime | X values | Y value |
|---|---|---|---|---|---|
| 0 | 35 | [35 ab fa] | 27(1f3) | [8e a0 66 56 d6] | [b5 84 18 f5 3e] |
| 1 | 51 | [51 b3 74] | 9(165) | [71 b1 58 e3 fd] | [52 d6 0f 4a 0d] |
| 2 | 73 | [73 93 d4] | 26(1e7) | [6d de fc 66 53] | [c4 bd b9 b5 4b] |
| 3 | df | [df 3e 0e] | 28(1f5) | [0c 15 2c 0e 0a] | [a8 a0 3d ec f4] |
| 4 | 79 | [79 85 63] | 23(1cf) | [65 19 71 40 ec] | [a9 45 ed d4 cf] |
| 5 | ab | [ab 3a e7] | 17(19f) | [8b 9 b4 be a8] | [de 9d 37 a b2] |
| 6 | 22 | [22 0c 3d] | 20(1b1) | [18 91 45 1d 9c] | [f5 6b f7 46 a3] |
| 7 | 14 | [14 a0 7c] | 18(1a3) | [79 a5 b5 7d 42] | [44 d8 cb 93 92] |
| 8 | 80 | [80 9 34] | 20(1b1) | [2d 3e cf f1 9d] | [44 d8 cb 93 92] |
| 9 | 43 | [43 71 17] | 25(1dd) | [ec fa b4 ea cd] | [b7 2f dc bd 7b] |
| 10 | 24 | [24 f9 20] | 17(19f) | [8a 99 63 e4 6c] | [00 f6 70 f8 31] |
| 11 | dc | [dc 26 3] | 6(14d) | [e0 23 c4 1b 5c] | [5b 8b c1 29 6d] |
| 12 | 13 | [13 81 2] | 17(19f) | [80 69 4 c1 a5] | [d5 ca 96 16 9c] |
| 13 | 54 | [54 62 85] | 22(1c3) | [29 ce d4 49 98] | [b8 60 72 a4 a9] |
| 14 | ab | [ab e6 a5] | 12(177) | [2c cd ab 59 53] | [db 2b b5 65 34] |
| 15 | 06 | [06 68 a9] | 5(13f) | [fc 6a 26 94 3e] | [53 f9 47 a6 e] |
| 16 | 3e | [3e 4c ab] | 3(12d) | [4b e9 d7 f5 89] | [cd 16 ae e3 93] |
| 17 | e7 | [e7 96 3c] | 11(171) | [e5 ec 6c 1f 87] | [73 e1 34 cf dc] |
| 18 | f1 | [f1 14 4b] | 6(14d) | [53 f6 19 3 a6] | [38 c3 eb e7 1c] |
| 19 | 51 | [51 e3 c9] | 22(1c3) | [d3 38 13 c 43] | [41 73 79 30 7b] |

Splitting Data

Now we use the Data Transformation key (also given below) to initialize the RRSG.

[35 51 73 df 79 ab 22 14 80 43 24 dc 13 54ab 6 3e e7f1 51]

The seeds generated using this Data Transformation key are:

Random generator 1 seed=0x709d391f63df40ab
Random generator 2 seed=0x6545785336f31810

As before, we use the random seeds to generate RRSG as given below. The first few values of RRSG are given below.

| Loop | Random 1 Long | Random 2 Long | XOR (Long) | SBOX(XOR) |
|---|---|---|---|---|
| 0 | 2b422e35a2b03dfe | 9d19c533a861a1b6 | b65beb060ad19c48 | 4e39e96f673ede52 |
| 1 | 4091934bf0b4582c | 8da0597e050fb1f6 | cd31ca35f5bbe9da | bdc77496e6ea1e57 |
| 2 | e4f901b38c9c4cb8 | 846f700ad7b94097 | 609671b95b250c2f | d090a356393ffe15 |
| 3 | 33ac789c0f46bd60 | d66df50f8a00f743 | e5c18d9385464a23 | d9785ddc975ad626 |
| 4 | 690cfa1129d24074 | e57e407a5a57ff1 | 675b1e168c773f85 | 8539724764f57597 |
| 5 | 3dff032b99f1ac62 | 64965a2cef404ba4 | 5969590776b1e7c6 | cbf9cbc538c894b4 |
| 6 | 686bd64a82872cc9 | 31b0907c61f2e3e0 | 59db4636e375cf29 | cbb95a05119d8aa5 |
| 7 | 5352ab13db4378a6 | ddf64c21b9621464 | 8ea4e73262216cc2 | 19499423aafd5025 |
| 8 | d5494a3ad8ba618d | c5d76650d379bee8 | 109e2c6a0bc3df65 | ca0b71022b2e9e4d |
| 9 | 9f70f63bc226b3df | 9f70f63bc226b3df | 6c6d692c35a7505b | 503cf971965c5339 |

Since m=3, we have a 2nd order polynomial with 3 coefficients. In this step we use all 3 coefficients with data. The raw data is given below once again for convenience.

00000000: 41 42 43 44 45 46 47 48 49 4A 4B 4C 4D 4E 4F 50|ABCDEFGHIJKLMNOP
00000010: 51 52 53 54 55 56 57 58 59 5A 0D 0A - - - - - - - -|QRSTUVWXYZ.

First, for the each sets of 3 bytes, we generate prime polynomial id (0-29) using 2 bytes of RRSG and then we generate 5 unique X values using 10 bytes of RRSG (more if x value repeats). Then, we use RRSG to get us 3 random bytes and XOR these bytes with the 3 data bytes and the result of this operation is the polynomial function. Note, unlike traditional Shamir Secret Sharing, where only the constant coefficient is used for associating with data, here we use all the coefficient. This is what gives us the storage efficiency. In this example, in order to make the data a multiple of 3, we perform PKCS7 padding.

| Index | Data (Hex) | RRSG | Polynomial | Prime | X values | Y value |
|---|---|---|---|---|---|---|
| 0-2 | [41 42 43] | [e6 ea 1e] | [a7 a8 5d] | 15(18b) | [35 78 f4 9 f7] | [68 34 5b 96 8a] |
| 3-5 | [44 45 46] | [dc 97 5a] | [98 d2 1c] | 10(169) | [5b 40 c0 1d ca] | [39 75 7f 33 3b] |
| 6-8 | [47 48 49] | [cb c5 38] | [8c 8d 71] | 12(177) | [cd a2 29 fb 65] | [91 03 0f bc 8b] |
| 9-11 | [4a 4b 4c] | [49 94 23] | [03 df 6f] | 18(1a3) | [ef 8d 22 69 10] | [23 e0 88 55 4] |
| 12-14 | [4d 4e 4f] | [50 3c f9] | [1d 72 b6] | 3(12d) | [1a 71 5a b1 2f] | [a3 8f fa df df] |
| 15-17 | [50 51 52] | [47 d2 32] | [17 83 60] | 8(163) | [6c 50 f6 3b 35] | [fb d2 67 b8 8e] |
| 18-20 | [53 54 55] | [d0 ab 24] | [83 ff 71] | 14(187) | [b3 2d c5 b7 5c] | [64 cd c2 1d a6] |
| 21-23 | [56 57 58] | [83 91 c1] | [d5 c6 99] | 18(1a3) | [1f 37 cc ba 7f] | [70 80 22 8b 5d] |
| 24-26 | [59 5a 0d] | [8a d5 39] | [d3 8f 34] | 5(13f) | [9b 1b 33 c1 3a] | [45 3e 90 f0 ab] |
| 27-29 | [0a 02 02] | [51 3c 3a] | [55 3e 38] | 13(17b) | [6c 19 78 c7 e4] | [7e 51 36 bb 36] |

We have a total of 30 Y values, with each Y having 5 bytes. We collect all the Y in column '0' and make it Split 0. Split 0 is actually stored in the logical store 3 (Europe) with file Identifier lup13icp5tp37j3ldhpjnsfuszge4f3xnppeoo3pvjpnt5ip30000010. The actual hexdump of split 0 is given below:

s.txt". The split specification name associated with the file is captured and associated with the file handle during the split process.

In our example, the split specification has m=3 and n=5. In other words, we can use any three of 5 shares to Split 0 stored on logical store 3 (Europe) with identifier
lup13icp5tp37j3ldhpjnsfuszge4f3xnppeoo3pvjpnt5ip30000010

```
00000000:  B5 52 C4 A8 A9 DE E5 59 44 B7 00 5B D5 B8 DB 53  | ʎR}ɛɜ□∩YD⁰ [⊩⊢┘ S
00000010:  CD 73 38 41 68 39 91 23 A3 FB 64 70 45 7E -- --  | ⊣s 8Ah9 ⊼#ᴜ ̈dpE~
```

All other data are stored as shown below:

Split 1 stored on logical store 2 (America) with identifier
a665as4rrvg39tc5gj27nze0ggfclbxikk2it8ggnpi2ejkgm00000b

```
00000000:  84 D6 BD A0 45 9D 6B 70 D8 2F F6 8B CA 60 2B F9  | ⊣⊣ E )xp□/⊔⊢`+⊔
00000010:  16 E1 C3 73 34 75 03 E0 8F D2 CD 80 3E 51 -- --  | .₤⊢s4u. ¢ ᴧ⊣⋯>Q
```

Split 2 stored on logical store 1 (Africa) with identifier
hk50gthh9socywkjari6pzjtvxv5ruwlg9qqg3n4jvnazjok600000b0

```
00000000:  18 0F B9 3D ED 37 F7 E9 CB DC 70 C1 96 72 B5 47  | ..双⸗⸗器 7⊐⊣‖ ⊢p □∍r⋏ G
00000010:  AE 34 EB 79 5B 7F 0F 88 FA 67 C2 22 90 36 -- --  | ⊮4ᶦ⁾y[..⊱⁻]g⊢"⋛ 6
```

Split 3 stored on logical store 4 (Australia) with identifier
n0mztnu180m7am0eet98m8z0p805grznoxyede5yinpw598ax0000000

```
00000000:  F5 4A B5 EC D4 0A 46 D3 93 BD F8 29 16 A4 65 A6  | |⎯ ⌐∟⊣ F⊤⫯π ⎯).L ⊝⊣⊓
00000010:  E3 CF E7 30 96 33 BC 55 DF B8 1D 8B F0 BB -- --  | ⊣⊓ ⊐∍ 3ᴱU⊓ x.ʟ □∃
```

Split 4 stored on logical store 0 (Asia) with identifier
ppedhqkc305ufj91esc9ddalj6lf3id9sv3edzag45y9y8sy400000f0

```
00000000:  3E 0D 4B F4 CF B2 A3 AF 92 7B 31 6D 9C A9 34 0E  | >.K □ ⊣⌐⎬⫫⌐{1m⎤⏌4.
00000010:  93 DC 1C 7B 8A 3B 8B 04 DF 8E A6 5D AB 36 -- --  | ⊢⏌.{⌐⊢ ⎯ ⊣⊓ ⊢∟⋻ 6
```

Reconstruction

The system has stored the split specification. When an authorized user wants to reconstruct the information, the user simply provides the file identifier (or handle) "letterreconstruct the data. In this example we will use the logical stores [2,3,4] that corresponds to [America Europe Australia] to reconstruct the content. Using the store specification, each shares identifier are calculated below:

| Logical Name | Logical Id | Store Level Key | Store specific Id MapBytes(sha256(fileId + key)) |
|---|---|---|---|
| america | 2 | l954kqt4qti1d8m3smx45 1nffabkll3by7c1m9rjhvpk cyhpl0000050 | a665as4rrvg39tc5gj27nze0ggfclbxik k2it8ggnpi2ejkgm00000b0 |
| europe | 3 | l2hmiusg0d6wk5xy4hgfg 3gxyendrwdkoy6wwj1g6 epjd31yf0000030 | lup13icp5tp37j3ldhpjnsfuszge4f3xnp peoo3pvjpnt5ip3000010 |
| australia | 4 | mc9cxrqcvam7zrj179jqa 7dyipm37vqdg6rompb4f bq3vokvq00000f0 | n0mztnu180m7am0eet98m8z0p805 grznoxyede5yinpw598ax0000000 |

We use the file-Id "letters.txt" and the Root Transformation key in the Split Specification to generate a key that was used to initialize RRSG during the split process. These transformations are specific to a split specification and in this example, we simply append the bytes corresponding to utf-8 representation of file-Id and the bytes of the Root Transformation Key and compute a sha-256 digest. This results in a file-id specific key as given below:
[e4 c9 b9 e7 80 24 5f a9 69 9 9a 41 57 36 c0 37 bf e9 ac d8 85 6e e0 8f 45 ce 32 53 b0 dc 6e 53]
RRSG As in the split process, we use this keys first eight bytes and make it seed for the first random number generator and use the second eight bytes to make the seed for the second random number generator. Thus the seeds are:

Random generator 1 seed=0xe9c03f444f4c47ab

Random generator 2 seed=0x9e16386450df8825

With the seed and the random algorithm, we have initialized the RRSG and it can now stream a repeatable set of bytes. First we generate set of 8 bytes from each random number and then XOR the longs and use SBOX table to generate the first 8 bytes of RRSG. This process is repeated to get a continuous supply of RRSG bytes as shown in the table below:

| Loop | Random 1 Long | Random 2 Long | XOR (Long) | SBOX(XOR) |
|---|---|---|---|---|
| 0 | 15413e42e63ad997 | bb5e1ac124ecc927 | ae1f2483c2d610b0 | e4c036ec25f6cae7 |
| 1 | bcf2aed713531421 | d4d2f2d9da5a050c | 68205c0ec909112d | 45b74aabdd0182d8 |
| 2 | eeb20879b599ad44 | 7172200fc85411cf | 9fc028767dcdbc8b | dbba3438ffbd653d |

Reconstruct Store Order

As before, we take an array [0,1,2,3,4] and use Fisher-Yates to shuffle the array. All that Fisher Yates requires is a random number generate. We used the already initialized RRSG to supply the Random bytes it needs. After the shuffling the Store order is [3 2 1 4 0]. This shuffling needs 4 short ints (8 bytes) of RRSG.

| Logical Name | Logical Id | Share Id | Store specific Id MapBytes(sha256(fileId + key)) |
|---|---|---|---|
| america | 2 | 1 | a665as4rrvg39tc5gj27nze0ggfclbxikk2it8ggnpi2ejkgm00000b0 |
| europe | 3 | 0 | lup13icp5tp37j3ldhpjnsfuszge4f3xnppeoo3pvjpnt5ip30000010 |
| australia | 4 | 3 | n0mztnu180m7am0eet98m8z0p805grznoxyede5yinpw598ax0000000 |

Reading Split Data

Now we use the store specific id to retrieve the raw split bytes:

Split 1 stored on logical store 2 (America) with identifier
a665as4rrvg39tc5gj27nze0ggfclbxikk2it8ggnpi2ejkgm00000b

```
00000000:  84 D6 BD A0 45 9D 6B 70 D8 2F F6 8B CA 60 2B F9
00000010:  16 E1 C3 73 34 75 03 E0 8F D2 CD 80 3E 51 -- --
```

Split 0 stored on logical store 3 (Europe) with identifier
lup13icp5tp37j3ldhpjnsfuszge4f3xnppeoo3pvjpnt5ip30000010

```
00000000:  B5 52 C4 A8 A9 DE F5 59 44 B7 00 5B D5 B8 DB 53
00000010:  CD 73 38 41 68 39 91 23 A3 FB 64 70 45 7E -- --
```

Split 3 stored on logical store 4 (Australia) with identifier
n0mztnu180m7am0eet98m8z0p805grznoxyede5yinpw598ax0000000

```
00000000:  F5 4A B5 EC D4 0A 46 D3 93 BD F8 29 16 A4 65 A6   | □ J∧ ↓⫪.F_T⫪ □ ).ᴸeiä
00000010:  E3 CF E7 30 96 33 BC 55 DF B8 1D 8B F0 BB -- --   | ⌐◻ □ ◻⋺ 3ᴱU□ ⫪.⫞ □ ⫞
```

Reconstructing Data Transformation Key

The Data Transformation key was split and stored using the hardened Shamir Secret Sharing algorithm. We now use the split bytes to reconstruct the Data Transformation key. The split specification used a 20 byte key size. We use the first 20 bytes in each split stream to reconstruct this data.

During the split process, we used a 2nd order polynomial in GF(256) as defined by:

$$f(x) = a_0 + a_1 x + a_2 x^2.$$

The data byte is stored in the constant coefficient. The raw split data provides the Y (polynomial evaluated at specific x's). Each set of Y is constructed by taking one byte from each stream. We will generated the X's used using the RRSG in the same fashion as during split process. To solve a Quadratic equation, we need 3 distinct points and therefore we need at least 3 shares to reconstruct the data. Note, we have to generate all X's in order to keep the internal states of RRSG identical to produce the same RRSG bytes during the split process. Once the 3 X values and their corresponding Y values are known, we use the Lagrange method to calculate the constant coefficient as:

$$a_0 = L(O) = \sum_{j=0}^{m-1} y(x_j) \prod_{k=0, k \neq j}^{m-1} \frac{x_k}{x_k - x_j}.$$

| Index | Prime | X values(Gen) | Used X | Y value | Data (a0) |
|---|---|---|---|---|---|
| 0 | 27(1f3) | [8e a0 66 56 d6] | [a0 8e 56] | [84 b5 f5] | 35 |
| 1 | 9(165) | [71 b1 58 e3 fd] | [b1 71 e3] | [d6 52 4a] | 51 |
| 2 | 26(1e7) | [6d de fc 66 53] | [de 6d 66] | [bd c4 b5] | 73 |
| 3 | 28(1f5) | [0c 15 2c 0e 0a] | [15 c e] | [a0 a8 ec] | df |
| 4 | 23(1cf) | [65 19 71 40 ec] | [19 65 40] | [45 a9 d4] | 79 |
| 5 | 17(19f) | [8b 09 b4 be a8] | [09 8b be] | [9d de 0a] | ab |
| 6 | 20(1b1) | [18 91 45 1d 9c] | [91 18 1d] | [6b f5 46] | 22 |
| 7 | 18(1a3) | [79 a5 b5 7d 42] | [a5 79 7d] | [70 59 d3] | 14 |
| 8 | 20(1b1) | [2d 3e cf f1 9d] | [3e 2d f1] | [d8 44 93] | 80 |
| 9 | 25(1dd) | [ec fa b4 ea cd] | [fa ec ea] | [2f b7 bd] | 43 |
| 10 | 17(19f) | [8a 99 63 e4 6c] | [99 8a e4] | [f6 00 f8] | 24 |
| 11 | 6(14d) | [e0 23 c4 1b 5c] | [23 e0 1b] | [8b 5b 29] | dc |
| 12 | 17(19f) | [80 69 4 c1 a5] | [69 80 c1] | [ca d5 16] | 13 |
| 13 | 22(1c3) | [29 ce d4 49 98] | [ce 29 49] | [60 b8 a4] | 54 |
| 14 | 12(177) | [2c cd ab 59 53] | [cd 2c 59] | [2b db 65] | ab |
| 15 | 5(13f) | [fc 6a 26 94 3e] | [6a fc 94] | [f9 53 a6] | 06 |
| 16 | 3(12d) | [4b e9 d7 f5 89] | [e9 4b f5] | [16 cd e3] | 3e |
| 17 | 11(171) | [e5 ec 6c 1f 87] | [ec e5 1f] | [e1 73 cf] | e7 |
| 18 | 6(14d) | [53 f6 19 3 a6] | [f6 53 03] | [c3 38 e7] | f1 |
| 19 | 22(1c3) | [d3 38 13 0c 43] | [38 d3 0c] | [73 41 30] | 51 |

The random is reconstructed as:
[35 51 73 df 79 ab 22 14 80 43 24 dc 13 54 ab 06 3e e7 f1 51]

Reconstruct Data

We now use the reconstructed Data Transformation Key to reinitialize RRSG. The seeds generated using this key are:
Random generator 1 seed=0x709d391f63df40ab
Random generator 2 seed=0x6545785336f31810
As before, we use the random seeds to generate RRSG as given below. The first few values of RRSG are given below

| Loop | Random 1 Long | Random 2 Long | XOR (Long) | SBOX(XOR) |
|---|---|---|---|---|
| 0 | 2b422e35a2b03dfe | 9d19c533a861a1b6 | b65beb060ad19c48 | 4e39e96f673ede52 |
| 1 | 4091934bf0b4582c | 8da0597e050fb1f6 | cd31ca35f5bbe9da | bdc77496e6ea1e57 |
| 2 | e4f901b38c9c4cb8 | 846f700ad7b94097 | 609671b95b250c2f | d090a356393ffe15 |
| 3 | 33ac789c0f46bd60 | d66df50f8a00f743 | e5c18d9385464a23 | d9785ddc975ad626 |
| 4 | 690cfa1129d24074 | e57e407a5a57ff1 | 675b1e168c773f85 | 8539724764f57597 |
| 5 | 3dff032b99f1ac62 | 64965a2cef404ba4 | 596959077651e7c6 | cbf9cbc538c894b4 |
| 6 | 686bd64a82872cc9 | 31b0907c61f2e3e0 | 59db4636e375cf29 | cbb95a05119d8aa5 |
| 7 | 5352ab13db4378a6 | ddf64c21b9621464 | 8ea4e73262216cc2 | 19499423aafd5025 |
| 8 | d5494a3ad8ba618d | c5d76650d379bee8 | 109e2c6a0bc3df65 | ca0b71022b2e9e4d |
| 9 | 9f70f63bc226b3df | 9f70f63bc226b3df | 6c6d692c35a7505b | 503cf971965c5339 |

As before, we use the RRSG to generate prime polynomial id, X values (all 5 of them). We use the one byte from each split file to construct Y's. We now have 3 distinct points and we now solve for the coefficient using the method of successive Lagrange polynomial interpolation as described earlier. The details are shown in the table.

| Index | RRSG | Prime | X values | Used X | Y value | Polynomial | Data XOR (Poly,RRSG) |
|---|---|---|---|---|---|---|---|
| 0-2 | [e6 ea 1e] | 15(18b) | [35 78 f4 9 f7] | [78 35 09] | [34 68 96] | [a7 a8 5d] | [41 42 43] |
| 3-5 | [dc 97 5a] | 10(169) | [5b 40 c0 1d ca] | [40 5b 1d] | [75 39 33] | [98 d2 1c] | [44 45 46] |
| 6-8 | [cb c5 38] | 12(177) | [cd a2 29 fb 65] | [a2 cd fb] | [03 91 bc] | [8c 8d 71] | [47 48 49] |
| 9-11 | [49 94 23] | 18(1a3) | [ef 8d 22 69 10] | [8d ef 69] | [e0 23 55] | [03 df 6f] | [4a 4b 4c] |
| 12-14 | [50 3c f9] | 3(12d) | [1a 71 5a b1 2f] | [71 1a b1] | [8f a3 df] | [1d 72 b6] | [4d 4e 4f] |

-continued

| Index | RRSG | Prime | X values | Used X | Y value | Polynomial | Data XOR (Poly,RRSG) |
|---|---|---|---|---|---|---|---|
| 15-17 | [47 d2 32] | 8(163) | [6c 50 f6 3b 35] | [50 6c 3b] | [d2 fb b8] | [17 83 60] | [50 51 52] |
| 18-20 | [d0 ab 24] | 14(187) | [b3 2d c5 b7 5c] | [2d b3 b7] | [cd 64 1d] | [83 ff 71] | [53 54 55] |
| 21-23 | [83 91 c1] | 18(1a3) | [1f 37 cc ba 7f] | [37 1f ba] | [80 70 8b] | [d5 c6 99] | [56 57 58] |
| 24-26 | [8a d5 39] | 5(13f) | [9b 1b 33 c1 3a] | [1b 9b c1] | [3e 45 f0] | [d3 8f 34] | [59 5a 0d] |
| 27-29 | [51 3c 3a] | 13(17b) | [6c 19 78 c7 e4] | [19 6c c7] | [51 7e bb] | [55 3e 38] | [0a 02 02] |

Now we take the data and remove padding. The padding length is the specified in the last byte. This results in the reconstructed data as given below. As one can see, every byte matches to original file.
00000000: 41 42 43 44 45 46 47 48 49 4A 4B 4C 4D 4E 4F 50|ABCDEFGHIJKLMNOP
00000010: 51 52 53 54 55 56 57 58 59 5A 0D 0A - - - - - - - - |QRSTUVWXYZ.

Figure 4A:
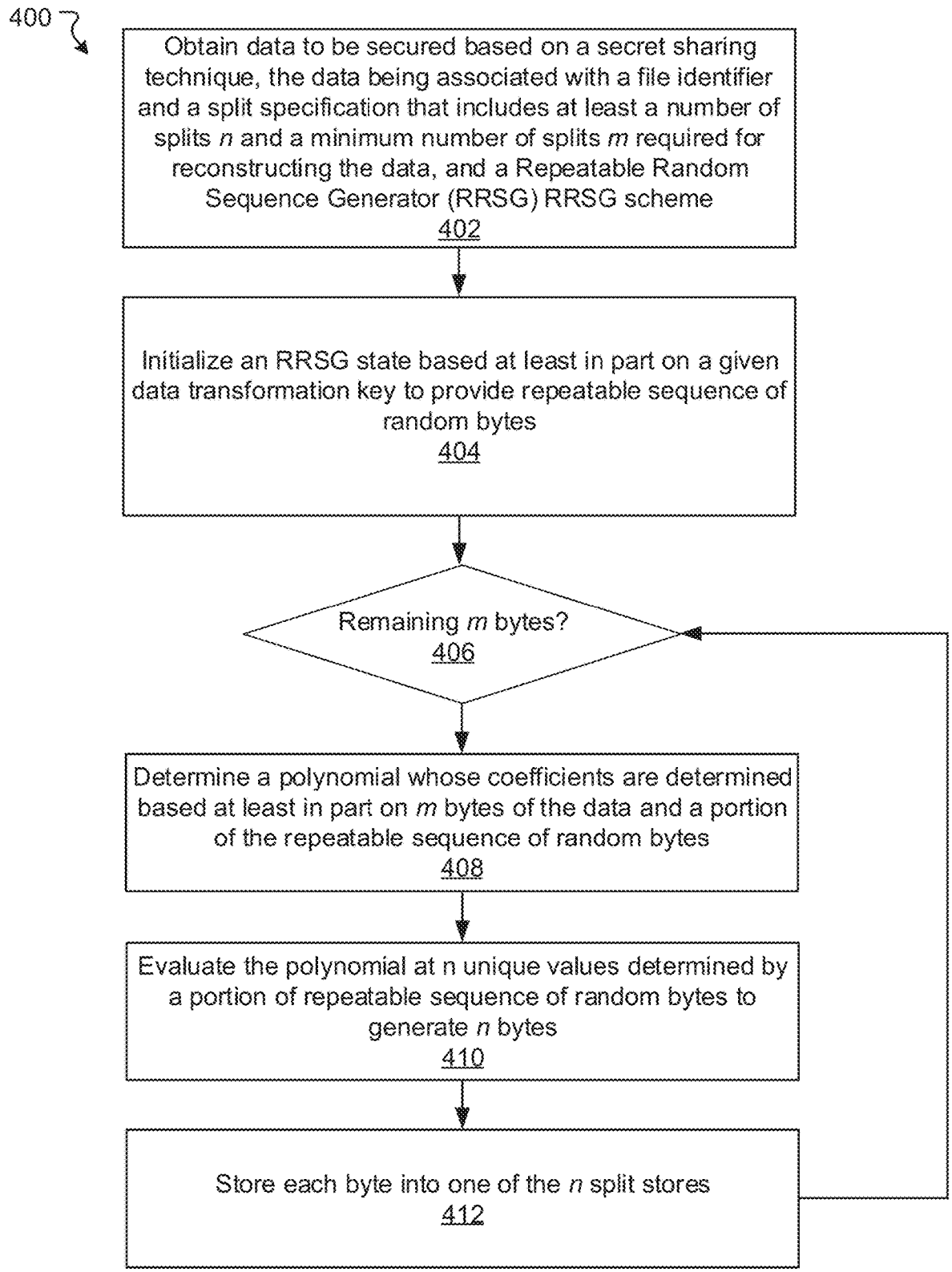
FIGS. 4A-4B illustrate example processes for splitting and reconstructing data.

FIG. 4A illustrates an example method 400, according to an embodiment of the present disclosure. It should be appreciated that there can be additional, fewer, or alternative steps performed in similar or alternative orders, or in parallel, within the scope of the various embodiments unless otherwise stated.

At block 402, data to be secured based on a secret sharing technique can be obtained, the data being associated with a file identifier and a split specification that includes at least a number of splits n and a minimum number of splits m required for reconstructing the data, and a Repeatable Random Sequence Generator (RRSG) RRSG scheme. At block 404, an RRSG state can be initialized based at least in part on a given data transformation key to provide repeatable sequence of random bytes. At block 406, a determination is made whether m bytes of data remain. If m bytes remain, for every m bytes of data, at block 408, a polynomial whose coefficients are determined based at least in part on m bytes of the data and a portion of the repeatable sequence of random bytes can be determined. At block 410, the polynomial can be evaluated at n unique values determined by a portion of repeatable sequence of random bytes to generate n bytes. At block 412, each byte can be stored into one of the n split stores.

Figure 4B:
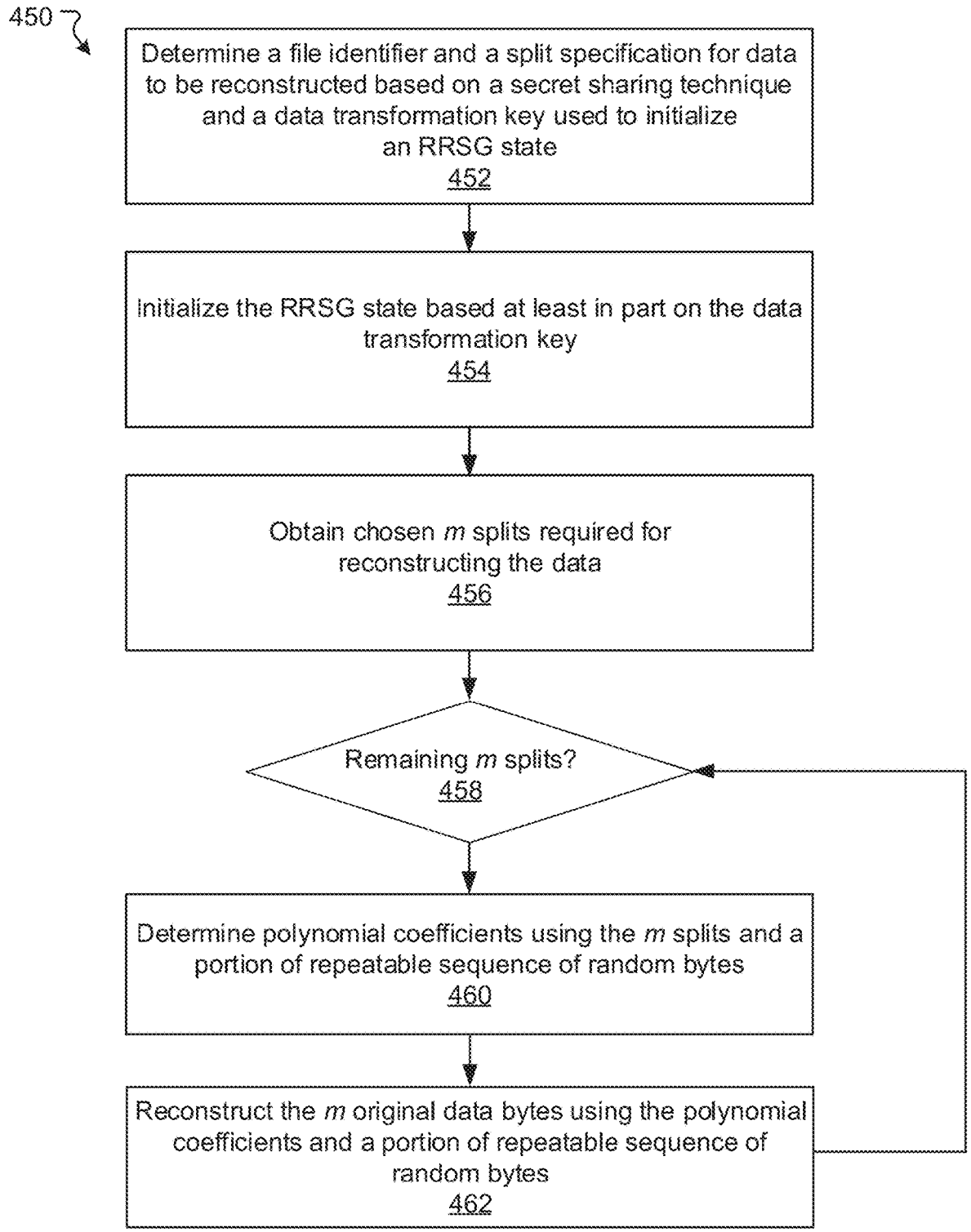

FIG. 4B illustrates an example method 450, according to an embodiment of the present disclosure. It should be appreciated that there can be additional, fewer, or alternative steps performed in similar or alternative orders, or in parallel, within the scope of the various embodiments unless otherwise stated.

At block 452, a file identifier and a split specification can be determined for data to be reconstructed based on a secret sharing technique and a data transformation key used to initialize an RRSG state. At block 454, the RRSG state can be initialized based at least in part on the data transformation key. At block 456, chosen m splits required for reconstructing the data can be obtained. At block 458, a determination is made whether m splits remain. If m splits remain, at block 460, for every byte of the m splits, polynomial coefficients can be determined using the m splits and a portion of repeatable sequence of random bytes. At block 462, the m original data bytes can be reconstructed using the polynomial coefficients and a portion of repeatable sequence of random bytes.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
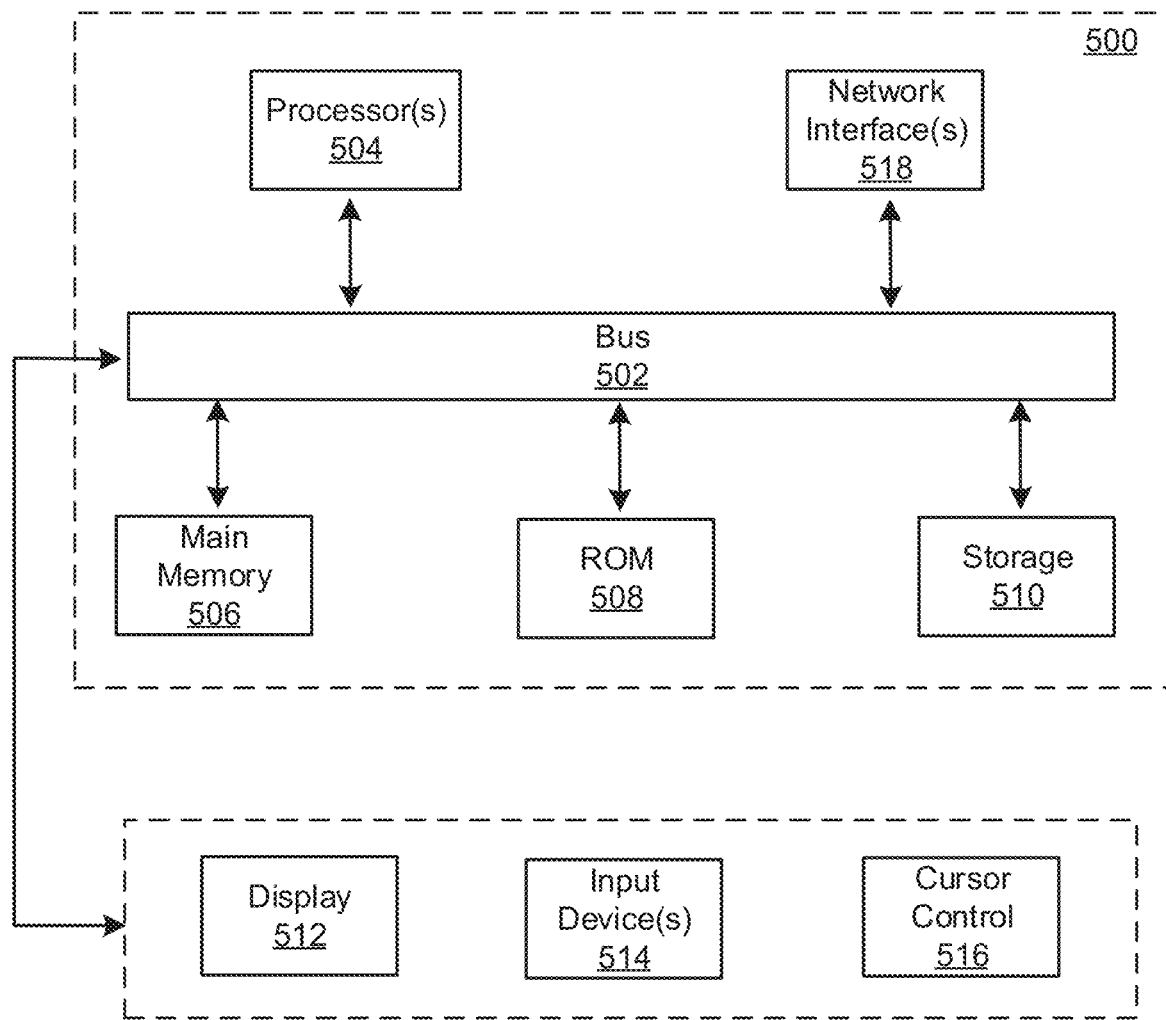
FIG. 5 is a block diagram that illustrates a computer system upon which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer-implemented method comprising:
obtaining, by a computing system, data to be secured based on a secret sharing technique, the data being associated with a file identifier and a split specification that defines at least a number of n split stores, a minimum number of splits m ($2 \leq m \leq n$) required for reconstructing the data, and a scheme for a randomly seek-able Repeatable Random Sequence Generator (RRSG), wherein a randomly seek-able Repeatable Random Sequence Generator permits non-linear reads of any files, secured according to the split specification, from different portions of the any files;
initializing, by the computing system, an RRSG state based at least in part on a given data transformation key to provide a repeatable sequence of random bytes; and
for every m bytes of data:
determining, by the computing system, a polynomial of order (m−1) comprising a plurality of coefficients that are determined based at least in part on the m bytes of the data and a portion of the repeatable sequence of random bytes, wherein the determining further comprises:
determining, by the computing system, each coefficient in the determined polynomial based on a combination of at least one byte in the m bytes of the data and at least one portion of the repeatable sequence of random bytes;
evaluating, by the computing system, the polynomial at n distinct non-zero values determined by the portion of the repeatable sequence of random bytes to generate n bytes, wherein each byte in the generated n bytes corresponds to one of the n split stores defined by the split specification; and
storing, by the computing system, each byte of the generated n bytes into one of the defined n split stores.

2. The computer-implemented method of claim 1, wherein the randomly seek-able RRSG is a stream cipher, and wherein the stream cipher has an initial state that includes the key, nonce, and a counter derived from the given Data Transformation Key.

3. The computer-implemented method of claim 1, wherein the randomly seek-able RRSG is encrypted data of a known data sequence using a symmetric cipher in counter mode with an encryption key and an initialization vector derived from the given Data Transformation Key.

4. The computer-implemented method of claim 1, wherein the data corresponds to a large sized file or stream of data, and wherein the random seek-able RRSG property is leveraged to split and store the large sized file or stream of data in parallel mode using multiple threads of execution operating on different sections of the file or stream of data.

5. The computer-implemented method of claim 1, wherein the data corresponds to a large sized file or stream of data, and wherein the random seek-able RRSG property is leveraged to reconstruct the large sized file or stream of data in parallel mode using multiple threads of execution with each thread operating on reconstruction different sections of the file or stream of data.

6. The computer method of claim 1, wherein the data corresponds to a file or stream of data, and wherein the random seek-able RRSG property is leveraged to reconstruct only portions of the file or stream of data by specifying an array of offsets and an array of lengths.

7. The computer method of claim 1, wherein the data corresponds to a stream of data, and wherein a signature is appended at the end of the stream of data and special MAGIC bytes are inserted at beginning of the stream of data prior to splitting the data.

8. The computer method of claim 7, wherein automatic verification of the signature or evaluation of MAGIC bytes is performed on at read-time to auto detect tampering and errors.

9. The computer method of claim 7, wherein the signature is based on CRC32 or SHA256.

10. The computer method of claim 7, wherein a signature is appended to every split of the stream of data, and wherein the signature is automatically verified to identify splits of the stream of data that are erroneous.

11. The computer method of claim 10, further comprising: automatically failing over to another split of the stream of data upon determining that a split of the stream of data is erroneous.

12. A system comprising:
at least one processor; and
a memory storing instructions that, when executed by the at least one processor, cause the system to perform:
obtaining data to be secured based on a secret sharing technique, the data being associated with a file identifier and a split specification that defines at least a number of n split stores a minimum number of splits m ($2 \leq m \leq n$) required for reconstructing the data, and a scheme for a randomly seek-able Repeatable Random Sequence Generator (RRSG), wherein a randomly seek-able Repeatable Random Sequence Generator permits non-linear reads of any files, secured according to the split specification, from different portions of the any files;
initializing an RRSG state based at least in part on a given data transformation key to provide repeatable sequence of random bytes; and
for every m bytes of data:
determining a polynomial of order (m−1) comprising a plurality of coefficients that are determined based at least in part on the m bytes of the data and a portion of the repeatable sequence of random bytes, wherein the determining further comprises:
determining each coefficient in the determined polynomial based on a combination of at least one byte in the m bytes of the data and at least one portion of the repeatable sequence of random bytes;
evaluating the polynomial at n distinct non-zero values determined by the portion of the repeatable sequence of random bytes to generate n bytes, wherein each byte in the generated n bytes corresponds to one of the n split stores defined by the split specification; and
storing each byte of the generated n bytes into one of the defined n split stores.

13. The system of claim 12, wherein the randomly seek-able RRSG is a stream cipher, and wherein the stream cipher has an initial state that includes the key, nonce, and a counter derived from the given Data Transformation Key.

14. The system of claim 12, wherein the randomly seek-able RRSG is encrypted data of a known data sequence using a symmetric cipher in counter mode with an encryption key and an initialization vector derived from the given Data Transformation Key.

15. The system of claim 12, wherein the data corresponds to a large sized file or stream of data, and wherein the random seek-able RRSG property is leveraged to split and store the large sized file or stream of data in parallel mode using multiple threads of execution operating on different sections of the file or stream of data.

16. The system of claim 12, wherein the data corresponds to a large sized file or stream of data, and wherein the random seek-able RRSG property is leveraged to reconstruct the large sized file or stream of data in parallel mode using multiple threads of execution with each thread operating on reconstruction different sections of the file or stream of data.

17. A non-transitory computer-readable storage medium including instructions that, when executed by at least one processor of a computing system, cause the computing system to perform:
obtaining data to be secured based on a secret sharing technique, the data being associated with a file identifier and a split specification that defines at least a number of n split stores a minimum number of splits m ($2 \leq m \leq n$) required for reconstructing the data, and a scheme for a randomly seek-able Repeatable Random Sequence Generator (RRSG), wherein a randomly seek-able Repeatable Random Sequence Generator permits non-linear reads of any files, secured according to the split specification, from different portions of the any files;
initializing an RRSG state based at least in part on a given data transformation key to provide repeatable sequence of random bytes; and
for every m bytes of data:
determining a polynomial of order (m−1) comprising a plurality of coefficients that are determined based at least in part on the m bytes of the data and a portion of the repeatable sequence of random bytes, wherein the determining further comprises:
determining each coefficient in the determined polynomial based on a combination of at least one byte in the m bytes of the data and at least one portion of the repeatable sequence of random bytes;
evaluating the polynomial at n distinct non-zero values determined by the portion of the repeatable sequence of random bytes to generate n bytes, wherein each byte in the generated n bytes corresponds to one of the n split stores defined by the split specification; and storing each byte of the generated n bytes into one of the defined n split stores.

18. The computing system of claim 17, wherein the randomly seek-able RRSG is a stream cipher, and wherein the stream cipher has an initial state that includes the key, nonce, and a counter derived from the given Data Transformation Key.

19. The computing system of claim 17, wherein the randomly seek-able RRSG is encrypted data of a known data sequence using a symmetric cipher in counter mode with an encryption key and an initialization vector derived from the given Data Transformation Key.

20. The computing system of claim 17, wherein the data corresponds to a large sized file or stream of data, and wherein the random seek-able RRSG property is leveraged to split and store the large sized file or stream of data in parallel mode using multiple threads of execution operating on different sections of the file or stream of data.

* * * * *